United States Patent
Miyazawa

(10) Patent No.: US 9,960,925 B2
(45) Date of Patent: May 1, 2018

(54) SERVER APPARATUS PROGRAM, SERVER APPARATUS, AND COMMUNICATION APPARATUS PROGRAM

(71) Applicant: Jun Miyazawa, Chiryu (JP)

(72) Inventor: Jun Miyazawa, Chiryu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1047 days.

(21) Appl. No.: 14/228,294

(22) Filed: Mar. 28, 2014

(65) Prior Publication Data

US 2014/0297829 A1   Oct. 2, 2014

(30) Foreign Application Priority Data

Mar. 29, 2013   (JP) .................................. 2013-071376

(51) Int. Cl.
| | | |
|---|---|---|
| *G06F 15/16* | (2006.01) | |
| *H04L 12/18* | (2006.01) | |
| *H04L 29/08* | (2006.01) | |
| *H04L 29/06* | (2006.01) | |

(52) U.S. Cl.
CPC .......... *H04L 12/1831* (2013.01); *H04L 29/06* (2013.01); *H04L 29/08072* (2013.01)

(58) Field of Classification Search
CPC .. H04L 29/08072; H04L 29/06; H04M 3/567; H04N 7/152
USPC ..... 709/203, 220, 223, 224, 228; 348/14.09; 726/19
See application file for complete search history.

(56) References Cited

U.S. PATENT DOCUMENTS

| | | | | |
|---|---|---|---|---|
| 8,499,922 B2* | 8/2013 | Hoshi | ............... | B23Q 11/0057 |
| | | | | 198/494 |
| 8,885,015 B2* | 11/2014 | Harel | ..................... | H04N 7/152 |
| | | | | 348/14.09 |
| 8,976,219 B2* | 3/2015 | Eskilsson | ................. | H04N 7/15 |
| | | | | 348/14.07 |
| 9,100,543 B2* | 8/2015 | Kwon | .................... | H04N 7/147 |
| 9,215,380 B2* | 12/2015 | Shigemasa | ............. | H04N 5/262 |
| 9,288,439 B2* | 3/2016 | Bloms | .................... | H04N 7/152 |
| 9,392,224 B2* | 7/2016 | Aiba | ..................... | H04N 7/152 |

FOREIGN PATENT DOCUMENTS

| | | | |
|---|---|---|---|
| JP | 2003-134487 A | 5/2003 | |
| JP | 2005-173705 A | 6/2005 | |

* cited by examiner

*Primary Examiner* — Khanh Dinh
(74) *Attorney, Agent, or Firm* — Banner & Witcoff, Ltd.

(57) ABSTRACT

A server apparatus performs a remote conference by a plurality of communication apparatuses. When a recording start instruction is acquired from any one of the communication apparatuses, the server apparatus specifies, based on layout information of the communication apparatuses, a display area in which layouts of two or more image information are corresponding to each other between two or more of the communication apparatuses. The server apparatus combines two or more image data corresponding respectively to the two or more image information included in the specified display area and generates one first kind record data. The first kind record data includes the two or more image information which are arranged in the layout of the two or more image information included in the specified display area.

6 Claims, 14 Drawing Sheets

FIG. 10

| CONFERENCE ID | APPARATUS ID | LAYOUT IDENTIFICATION INFORMATION |
|---|---|---|
| 0×01 | ID_50A | FIRST LAYOUT IDENTIFICATION INFORMATION |
| | ID_50B | SECOND LAYOUT IDENTIFICATION INFORMATION |
| | ID_50C | FIRST LAYOUT IDENTIFICATION INFORMATION |

FIG. 14

| CONFE-RENCE ID | APPA-RATUS ID | IMAGE INFORMATION AREA (82) | | | IMAGE INFORMATION AREA (84) | IMAGE INFORMATION AREA (86) CHAT INFORMATION (15) | | IMAGE INFORMATION AREA (90) |
|---|---|---|---|---|---|---|---|---|
| | | IMAGE (13A) | IMAGE (13B) | IMAGE (13C) | MATERIAL (14) | COMMON AREA (87) SHARED CHAT INFORMATION (15S) | PERSONAL AREA (88) UNSHARED CHAT INFORMATION (15N) | PARTICIPANT LIST (16) |
| 0×01 | ID_50A | Xa1,Ya1,Wa1,Ha1 | Xa2,Ya2,Wa2,Ha2 | Xa3,Ya3,Wa3,Ha3 | Xa4,Ya4,Wa4,Ha4 | 0,0,0,0 | 0,0,0,0 | Xa7,Ya7,Wa7,Ha7 |
| | ID_50B | Xb1,Yb1,Wb1,Hb1 | Xb2,Yb2,Wb2,Hb2 | Xa3,Ya3,Wa3,Ha3 | Xb4,Yb4,Wb4,Hb4 | Xb5,Yb5,Wb5,Hb5 | Xb6,Yb6,Wb6,Hb6 | 0,0,0,0 |
| | ID_50C | 0,0,0,0 | 0,0,0,0 | 0,0,0,0 | Xc4,Yc4,Wc4,Hc4 | Xb5,Yb5,Wb5,Hb5 | Xb6,Yb6,Wb6,Hb6 | 0,0,0,0 |

US 9,960,925 B2

SERVER APPARATUS PROGRAM, SERVER APPARATUS, AND COMMUNICATION APPARATUS PROGRAM

CROSS-REFERENCE TO RELATED APPLICATION

This application claims priority from Japanese Patent Application No. 2013-071376, filed on Mar. 29, 2013, the entire subject matter of which is incorporated herein by reference.

TECHNICAL FIELD

This disclosure relates to a server apparatus program which is executable by a computer for controlling a server apparatus for performing a remote conference by a plurality of communication apparatuses through a network, the server apparatus, and a communication apparatus program which is executable by a computer for controlling a communication apparatus.

BACKGROUND

There have been proposed techniques relating to a remote conference through a network. For example, in a known multi-point conference system, a plurality of conference apparatuses and a conference server apparatus are connected through a network, and the conference server apparatus combines images and voices received from the plurality of conference apparatuses, and distributes the combined result to the plurality of conference apparatuses. An image combining unit of the server apparatus stores an XML file defining a screen combined layout of the combined image to be distributed to each conference apparatus. This screen combined layout of the XML file can be selected for each conference apparatus at an arbitrary time such as during a conference or before a conference starts. The image combining unit combines images of conference participants based on the layout set for each conference apparatus according to the definition file, and distributes the combined image to each apparatus.

SUMMARY

A remote conference system including a plurality of communication apparatuses connected through a network has been put to practical use. The remote conference system includes a server apparatus and the plurality of communication apparatuses, and these apparatuses are connected through a network. The server apparatus distributes media data to the respective communication apparatuses. In each communication apparatus, the media data is acquired, and a remote conference screen is displayed on a display of the communication apparatus according to the media data. The media data includes a plurality of image data corresponding respectively to a plurality of image information displayed within the remote conference screen. A user who operates a communication apparatus to participate in the remote conference can appropriately set display or non-display and a layout of respective image information within the remote conference screen displayed on the display of the communication apparatus, for example, according to the user's preference.

The communication apparatus can request the server apparatus to start recording of the remote conference. In response to the recording start request, the server apparatus generates record data based on image data which is media data. In the communication apparatus, for example, after the remote conference ends, the record data can be reproduced. Therefore, after the remote conference ends, it is possible to confirm the situation of the remote conference. During reproducing of the record data, it is preferable to display a remote conference screen including the respective image information disposed in a state visually recognized when the remote conference was performed. However, it may be problematic in securing storage capacity to store a number of record data corresponding to the respective communication apparatuses and according to the layouts of the respective image information in respective communication apparatuses. Therefore, when displaying a remote conference screen including the respective image information disposed in a state visually recognized when the remote conference was performed, it is required to suppress an increase in a data capacity of the record data.

Accordingly, an object of this disclosure is to provide a server apparatus program which is executable by a computer for controlling a server apparatus and can generate remote conference record data including a plurality of image information disposed in a same state as a remote conference screen which was displayed during a remote conference, the server apparatus, and a communication apparatus program.

According to an aspect of this disclosure, there is provided a server apparatus which performs a remote conference by a plurality of communication apparatuses. When a recording start instruction is acquired from any one of the communication apparatuses, the server apparatus specifies, based on layout information of the communication apparatuses, a display area in which layouts of two or more image information are corresponding to each other between two or more of the communication apparatuses. The server apparatus combines two or more image data corresponding respectively to the two or more image information included in the specified display area and generates one first kind record data. The first kind record data includes the two or more image information which are arranged in the layout of the two or more image information included in the specified display area.

BRIEF DESCRIPTION OF THE DRAWINGS

The above and other aspects of the present invention will become more apparent and more readily appreciated from the following description of illustrative embodiments of the present invention taken in conjunction with the attached drawings, in which:

FIG. 10 is a view showing an example of a layout table based on layout identification information;

FIG. 14 is a view showing an example of a layout table based on layout information of a coordinate system.

DETAILED DESCRIPTION

There will be described illustrative embodiments of this disclosure with reference to the accompanying drawings. This disclosure is not limited to a configuration to be described below and can employ various configurations within the same technical concept. For example, a portion of the configuration to be described below may be omitted or may be replaced with any other configuration or the like. This disclosure may include other configurations.

<Remote Conference System>

Figure 1:
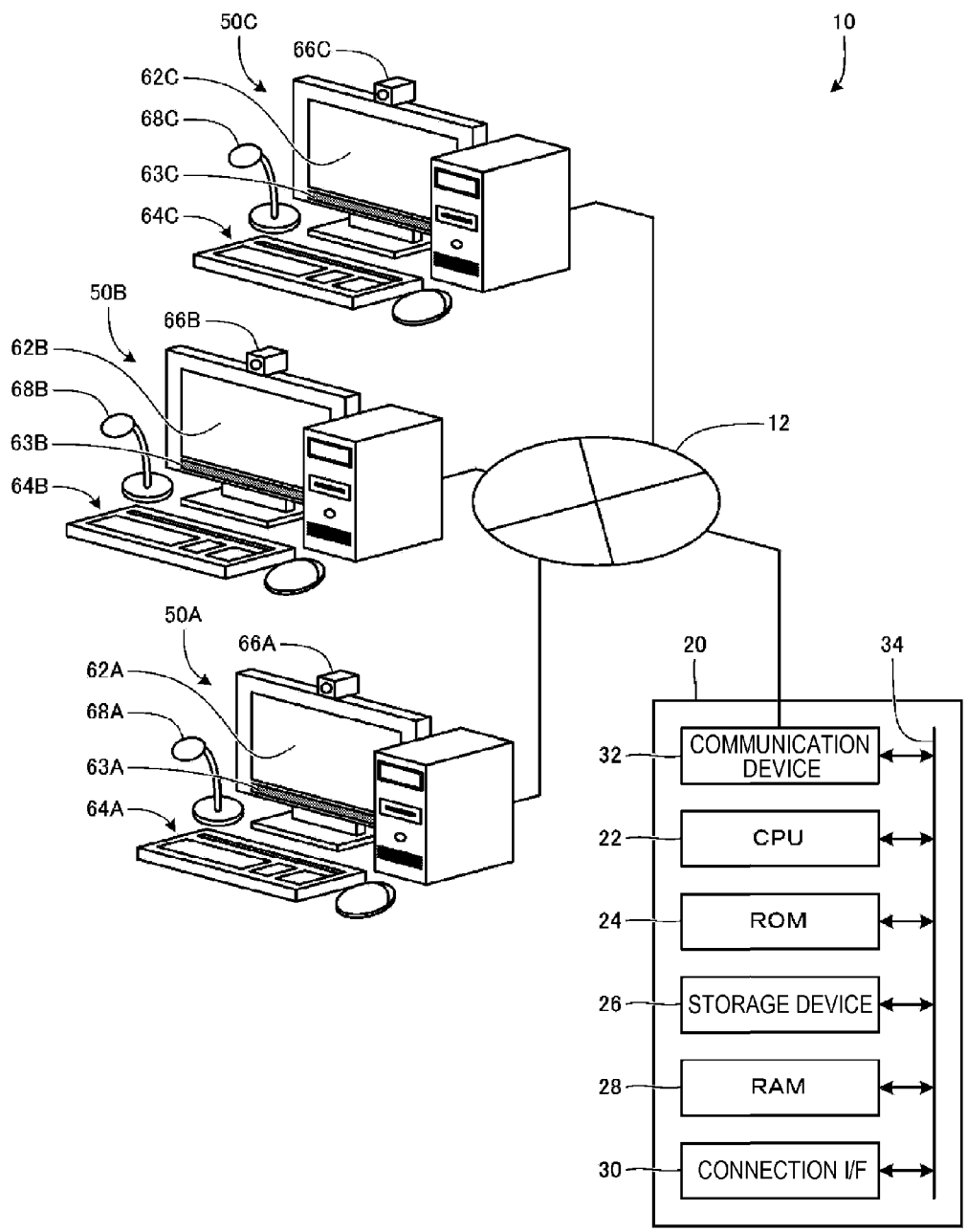
FIG. 1 is a view showing an example of a remote conference system.

An overview of a remote conference system 10 will be described with reference to FIG. 1. As shown in FIG. 1, the remote conference system 10 includes a server apparatus 20, and communication apparatuses 50A, 50B and 50C. In this illustrative embodiment, a remote conference which is performed by the communication apparatuses 50A, 50B and 50C will be described as an example. A remote conference by the remote conference system 10 may be performed by two communication apparatuses, or by four or more communication apparatuses. The server apparatus 20, and the communication apparatuses 50A, 50B and 50C are connected to a network 12. The network 12 is, for example, a network like the Internet. The remote conference by the communication apparatuses 50A, 50B and 50C is performed through the server apparatus 20, like in a known remote conference system. In the remote conference system 10, during the remote conference, it is possible to use a chat service similar to those in a known remote conference system. The chat service is also performed through the server apparatus 20.

The server apparatus 20 performs the remote conference by the communication apparatuses 50A, 50B and 50C. The remote conference by the communication apparatuses 50A, 50B and 50C is communication which uses images and voices and is performed among the communication apparatuses 50A, 50B and 50C. In the remote conference system 10, it is possible to record the remote conference which is performed among the communication apparatuses 50A, 50B and 50C. The server apparatus 20 starts recording of the remote conference based on a recording start instruction from any one of the communication apparatuses 50A, 50B and 50C, and stops the recording of the remote conference based on a recording stop instruction. This point will be described below.

Figure 2:
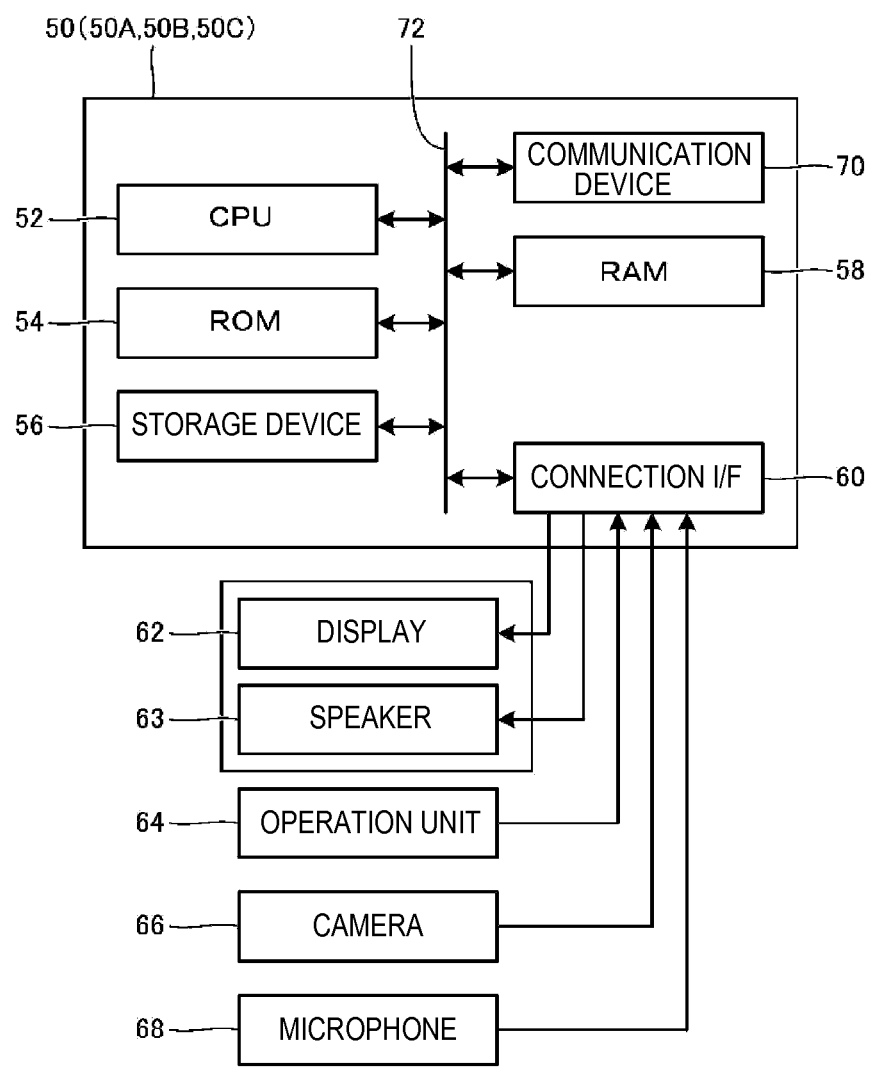
FIG. 2 is a block diagram showing an example of an electrical configuration of a communication apparatus.

The communication apparatuses 50A, 50B and 50C are communication apparatuses similar to communication apparatuses which are used in a known remote conference system having been already put to practical use. Specifically, the communication apparatuses 50A, 50B and 50C are, for example, information processing apparatuses like a personal computer. Each of the communication apparatuses 50A, 50B and 50C includes units 52 to 60 and 70 as shown in FIG. 2. This point will be described below. The communication apparatuses 50A, 50B and 50C are connected with displays 62A, 62B and 62C, operation units 64A, 64B and 64C, cameras 66A, 66B and 66C, and microphones 68A, 68B and 68C, respectively.

In the displays 62A, 62B and 62C, for example, remote conference screens 80 are displayed, respectively. The remote conference screens 80 will be described below. In a case where the communication apparatuses 50A, 50B and 50C are personal computers, the displays 62A, 62B and 62C are, for example, displays such as liquid crystal displays. The displays configuring the displays 62A, 62B and 62C include speakers 63A, 63B, and 63C provided integrally. Each of the operation units 64A, 64B and 64C is configured by a keyboard, a mouse, and the like. In the communication apparatuses 50A, 50B and 50C, after start of the remote conference, when the chat service is used, characters are input through the operation units 64A, 64B and 64C, and chat data corresponding to the input characters is generated.

The cameras 66A, 66B and 66C capture outside images. In the communication apparatuses 50A, 50B and 50C, with start of the remote conference, image capturing of the cameras 66A, 66B and 66C is started, and capture image data corresponding to the captured outside images are generated. An outside image captured by the camera 66A in the communication apparatus 50A is referred to as a capture image 13A. An outside image captured by the camera 66B in the communication apparatus 50B is referred to as a capture image 13B. An outside image captured by the camera 66C in the communication apparatus 50C is referred to as a capture image 13C. The microphones 68A, 68B and 68C acquire outside sounds. The acquired outside sounds are, for example, voices spoken by the users of the communication apparatuses 50A, 50B and 50C. In the communication apparatuses 50A, 50B and 50C, with start of the remote conference, voice acquisition of the microphones 68A, 68B and 68C is started, and voice data corresponding to the acquired voices are generated.

Each of the communication apparatuses 50A, 50B and 50C transmits capture image data, voice data, chat data, and material data generated by the communication apparatus, to the server apparatus 20. The material data is data corresponding to a material 14 (see FIGS. 3 to 5). In the remote conference system 10, the material 14 (material data) is shared by the communication apparatuses 50A, 50B and 50C which are used in the remote conference, and the shared material 14 can be used in the remote conference.

The server apparatus 20 receives the above-described respective data transmitted from each of the communication apparatuses 50A, 50B and 50C, thereby acquiring the respective data. The server apparatus 20 distributes the above-described respective data acquired from the communication apparatuses 50A, 50B and 50C, to the communication apparatuses 50A, 50B and 50C. In this illustrative embodiment, the above-described respective data which are transmitted and received between the server apparatus 20 and the communication apparatuses 50A, 50B and 50C are collectively referred to as "media data". In addition to the above-described respective data, list data corresponding to a participant list 16 is included in the media data. The participant list 16 includes information relating to respective users who operate the communication apparatuses 50A, 50B and 50C, respectively, thereby participating in the remote conference (see FIG. 5). As the information relating to the users, full names, affiliations, and the like of the users can be exemplified. The media data which are transmitted from the server apparatus 20 to the communication apparatus 50A, 50B or 50C does not include voice data from the transmission source. The reason is that if the voice data of each of the communication apparatuses 50A, 50B and 50C is reproduced in the own communication apparatus, and is output from the speaker 63A, 63B or 63C, the output voice is superimposed on the voice spoken by the user of the own communication apparatus 50A, 50B or 50C.

If the communication apparatuses 50A, 50B and 50C are not distinguished or are collectively referred to, they are referred to as a communication apparatus 50. If the displays 62A, 62B and 62C are not distinguished or are collectively referred to, they are referred to as a display 62. If the speakers 63A, 63B and 63C are not distinguished or are collectively referred to, they are referred to as a speaker 63. If the operation units 64A, 64B and 64C are not distinguished or are collectively referred to, they are referred to as an operation unit 64. If the cameras 66A, 66B and 66C are not distinguished or are collectively referred to, they are referred to as a camera 66. If the microphones 68A, 68B and 68C are not distinguished or are collectively referred to, they are referred to as a microphone 68.

In this illustrative embodiment, the points relating to recording of the remote conference screens 80 will be mainly described. For this reason, as the media data which are transmitted and received between the server apparatus 20 and the communication apparatuses 50A, 50B and 50C, image data which are the capture image data, the material data, the chat data and the list data of the communication apparatuses 50A, 50B and 50C is exemplified. Descriptions relating to the voice data and the voices will be appropriately omitted.

<Remote Conference Screen>

The remote conference screen 80 which is displayed on the display 62 of the communication apparatus 50 will be described with reference to FIGS. 3 to 5. The remote conference screen 80 can include a plurality of image information. The remote conference screens 80 include image information areas 82, 84, 86, 88, and 90 corresponding to image information to be displayed. That is, if the capture images 13A, 13B and 13C are displayed, the remote conference screen 80 includes the image information area 82 displaying the capture images 13A, 13B and 13C (see FIGS. 3 and 4). If the material 14 is displayed, the remote conference screen 80 includes the image information area 84 displaying the material 14 (see FIGS. 3 to 5). If the chat information 15 is displayed, the remote conference screen 80 includes the image information area 86 displaying the chat information 15 (see FIGS. 4 and 5). The chat information 15 includes shared chat information 15S and unshared chat information 15N. The shared chat information 15S is character information transmitted from each of the communication apparatuses 50A, 50B and 50C through the server apparatus 20 and shared by the communication apparatuses 50A, 50B and 50C. The unshared chat information 15N is character information corresponding to a new input before sharing. The image information area 86 includes a common area 87 and a personal area 88. In the common area 87, the shared chat information 15S is displayed. In the personal area 88, the unshared chat information 15N is displayed. If the participant list 16 is displayed, the remote conference screen 80 includes the image information area 90 (see FIG. 3).

In the remote conference system 10, combinations of layouts of the plurality of image information (the image information areas 82, 84, 86 (the common area 87 and the personal area 88), and 90) are patterned, and a plurality of patterned layout information is defined in advance. In this illustrative embodiment, layout information corresponding to the layout of image information as shown in FIG. 3 is referred to as a first layout information, and layout identification information identifying the first layout information is referred to as first layout identification information. Layout information corresponding to the layout of image information as shown in FIG. 4 is referred to as second layout information, and layout identification information identifying the second layout information is referred to as second layout identification information. Layout information corresponding to the layout of image information as shown in FIG. 5 is referred to as third layout information, and layout identification information identifying the third layout information is referred to as third layout identification information.

Figure 3:
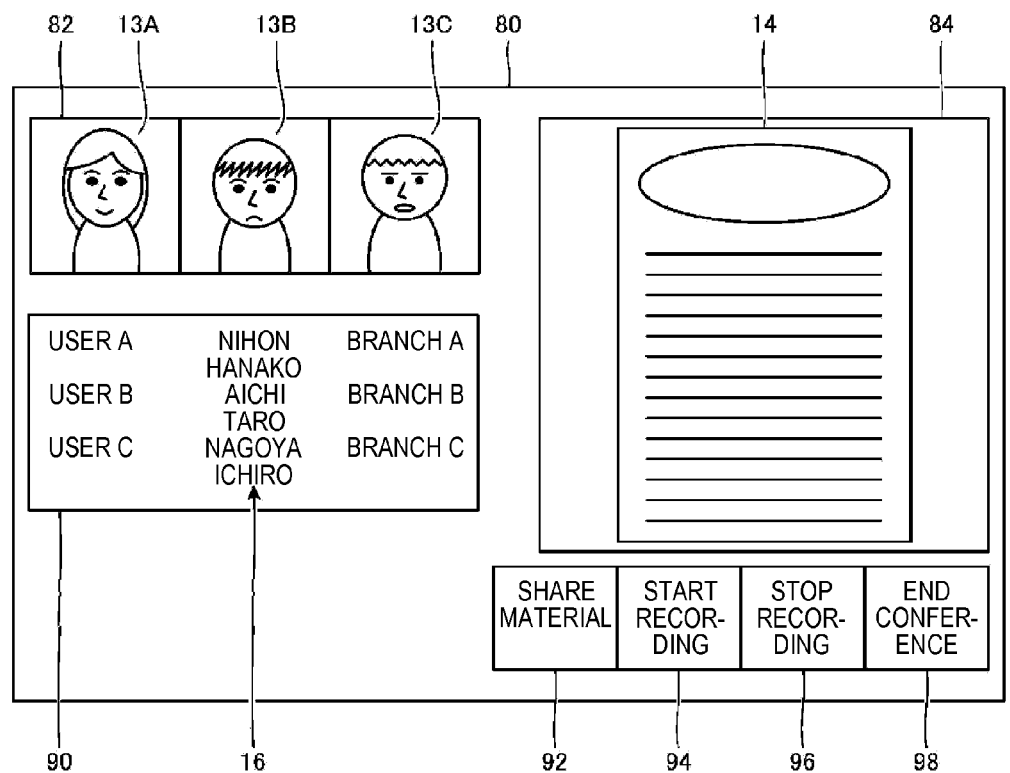
FIG. 3 is a view showing an example of a remote conference screen corresponding to first layout information.
Figure 4:
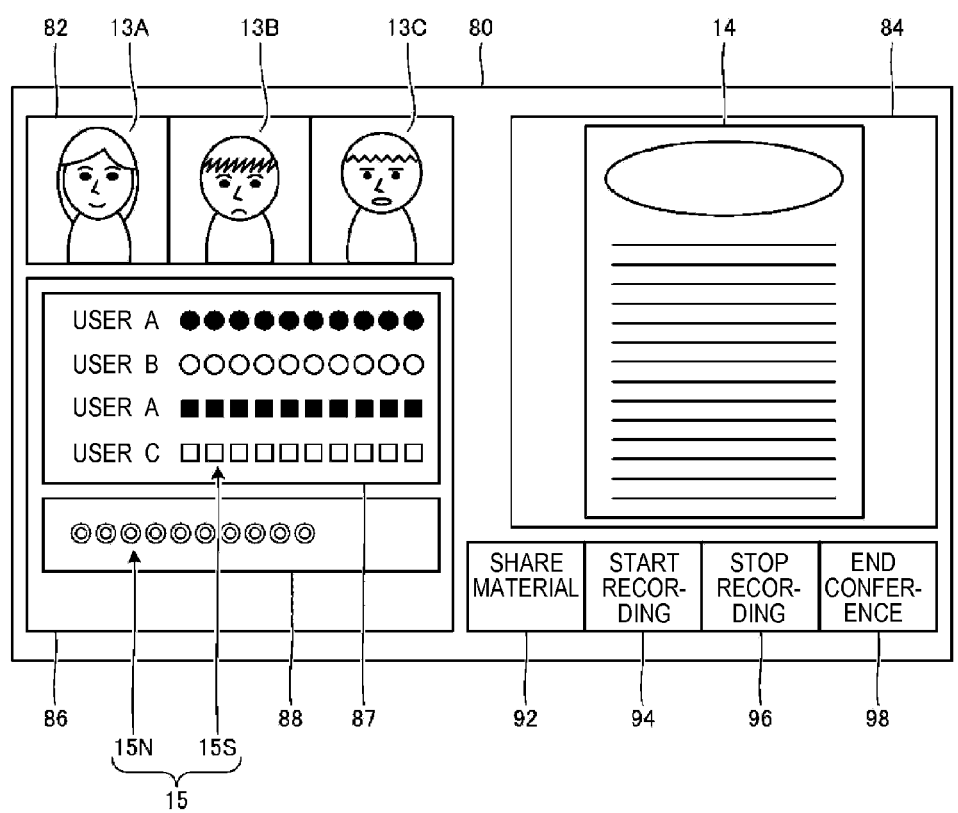
FIG. 4 is a view showing an example of a remote conference screen corresponding to second layout information.
Figure 5:
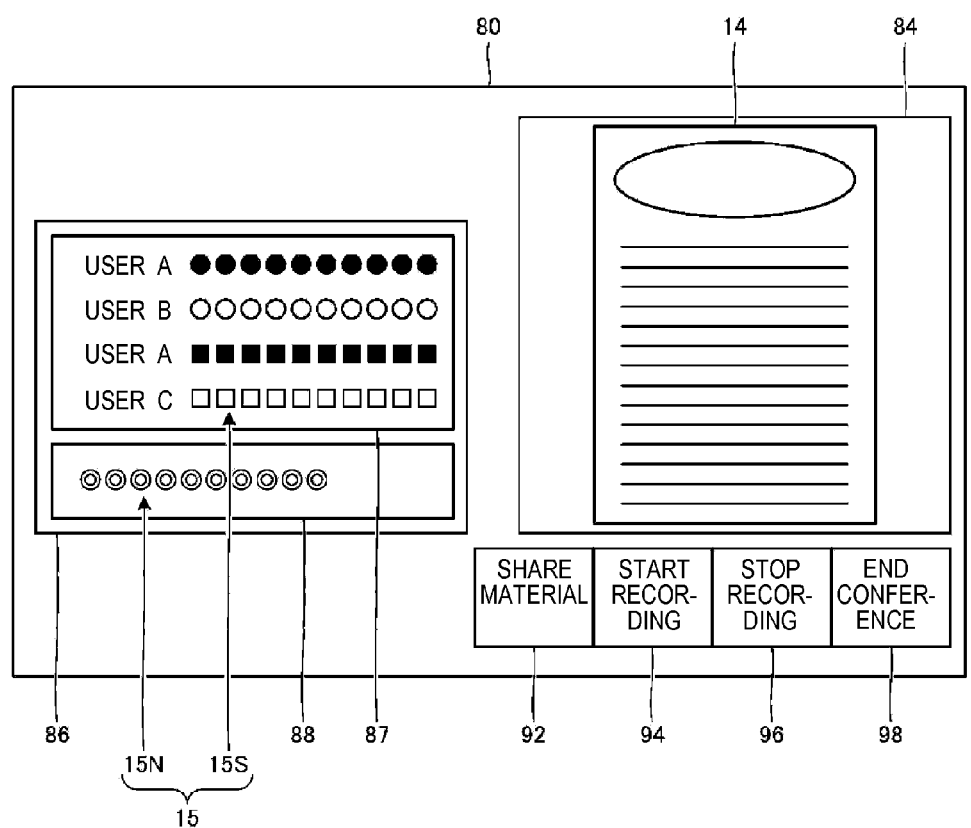
FIG. 5 is a view showing an example of a remote conference screen corresponding to third layout information.

The remote conference screen 80 includes a material sharing button 92, a recording start button 94, a recording stop button 96, and a conference end button 98, for example, at predetermined positions shown in FIGS. 3 to 5, regardless of layout information. Functions and the like assigned to the respective buttons 92 to 98 will be described in a communication apparatus process (see FIGS. 6 and 7) to be described below.

<Server Apparatus>

The electrical configuration of the server apparatus 20 will be described with reference to FIG. 1. The server apparatus 20 includes a CPU 22, a ROM 24, a storage device 26, a RAM 28, a connection interface (connection I/F) 30, and a communication device 32. The CPU 22, the ROM 24, the storage device 26, the RAM 28, the connection interface (connection I/F) 30, and the communication device 32 are connected to a bus 34. The CPU 22 performs arithmetic processes. The ROM 24 is configured, for example, by a flash memory. The ROM 24 stores programs such as BIOS.

The storage device 26 is configured by a computer-readable recording medium, for example, a hard disk. However, the storage device 26 may be configured by a storage device, a ROM, or the like other than a hard disk. The storage device 26 stores an operating system (OS) and various applications. Applications which are stored in the storage device 26 include a server apparatus program for performing processes shown in FIG. 8, FIG. 9, and FIGS. 11 to 13 to be described below. Installation of the program for performing the respective processes can be performed by reading the program stored in a computer-readable storage medium such as an optical medium or a semiconductor memory, by a reading unit (not shown) of the server apparatus 20. Alternatively, the installation may be performed by receiving the program stored in a computer-readable storage medium such as a hard disk of a download server (not shown) connected to the server apparatus 20 through the network 12, as a transmission signal through the communication device 32 of the server apparatus 20. Also, the computer-readable storage medium may not include a signal to be transitorily transmitted. The computer-readable storage medium may be a non-transitory storage medium. The non-transitory storage medium does not include a transitory signal. The non-transitory storage medium needs only to be a recording medium allowing information to be recorded regardless of the storage period of the information.

The RAM 28 serves as a storage area which is used when the CPU 22 executes various programs. The RAM 28 stores, during a process, predetermined data and information which are used in the process. The CPU 22 controls the server apparatus 20, for example, by executing applications including the OS and the server apparatus program stored in the storage device 26. Accordingly, in the server apparatus 20, various processes are performed, whereby various functional operations are implemented.

The connection I/F 30 is an interface to which predetermined devices can be connected. The communication device 32 connects the server apparatus 20 to the network 12, and performs data communication with the communication apparatuses 50A, 50B and 50C through the network 12. The communication device 32 may be an interface circuit that meets a network standard (e.g., Ethernet standard, IEEE 802.11 standard).

<Communication Apparatuses>

The electrical configurations of the communication apparatuses 50 will be described with reference to FIG. 2. All of the communication apparatuses 50A, 50B and 50C have the following electrical configuration. The communication apparatus 50 includes a CPU 52, a storage device 56, a RAM 58, a connection I/F 60, and a communication device 70. The CPU 52, the storage device 56, the RAM 58, the connection I/F 60, and the communication device 70 are connected to a bus 72. The CPU 52 performs arithmetic processes. The ROM 54 is configured, for example, by a flash memory. The ROM 54 stores programs such as BIOS.

The storage device 56 is configured, for example, by a hard disk. The storage device 56 stores an OS and various applications. Applications which are stored in the storage device 56 include a communication apparatus program for performing processes shown in FIGS. 6 and 7 to be described below. Installation of the program for performing the respective processes can be performed by reading the program stored in a computer-readable storage medium such as an optical medium or a semiconductor memory, by a reading unit (not shown) of the communication apparatus 50. Alternatively, the installation may be performed by receiving the program stored in a computer-readable storage medium such as a hard disk of a server (the server apparatus 20 or a server not shown) connected to the communication apparatus 50 through the network 12, as a transmission signal through the communication device 70 of the communication apparatus 50. Which installation method will be taken can be appropriately determined in view of various circumstances. Also, the computer-readable storage medium may not include a signal to be transitorily transmitted. The computer-readable storage medium may be a non-transitory storage medium. The non-transitory storage medium does not include a transitory signal. The non-transitory storage medium needs only to be a recording medium allowing information to be recorded regardless of the storage period of the information.

The RAM 58 serves as a storage area which is used when the CPU 52 executes various programs. The RAM 58 stores, during a process, predetermined data and information which are used in the process. The CPU 52 controls the communication apparatus 50, for example, by executing applications including the OS and the communication apparatus program stored in the storage device 56. As a result, in the communication apparatus 50, various processes are performed, whereby various functional operations are implemented.

The connection I/F 60 is an interface to which predetermined devices can be connected. For example, to the connection I/F 60, the display 62, the speaker 63, the operation unit 64, the camera 66, and the microphone 68 are connected. Output to the display 62 and the speaker 63, and input from the operation unit 64, the camera 66 and the microphone 68 are performed through the connection I/F 60. The communication device 70 connects the communication apparatus 50 to the network 12 and performs data communication with the server apparatus 20 through the network 12. The communication device 70 may be an interface circuit that meets a network standard (e.g., Ethernet standard, IEEE 802.11 standard).

<Communication Apparatus Process>

Figure 6:
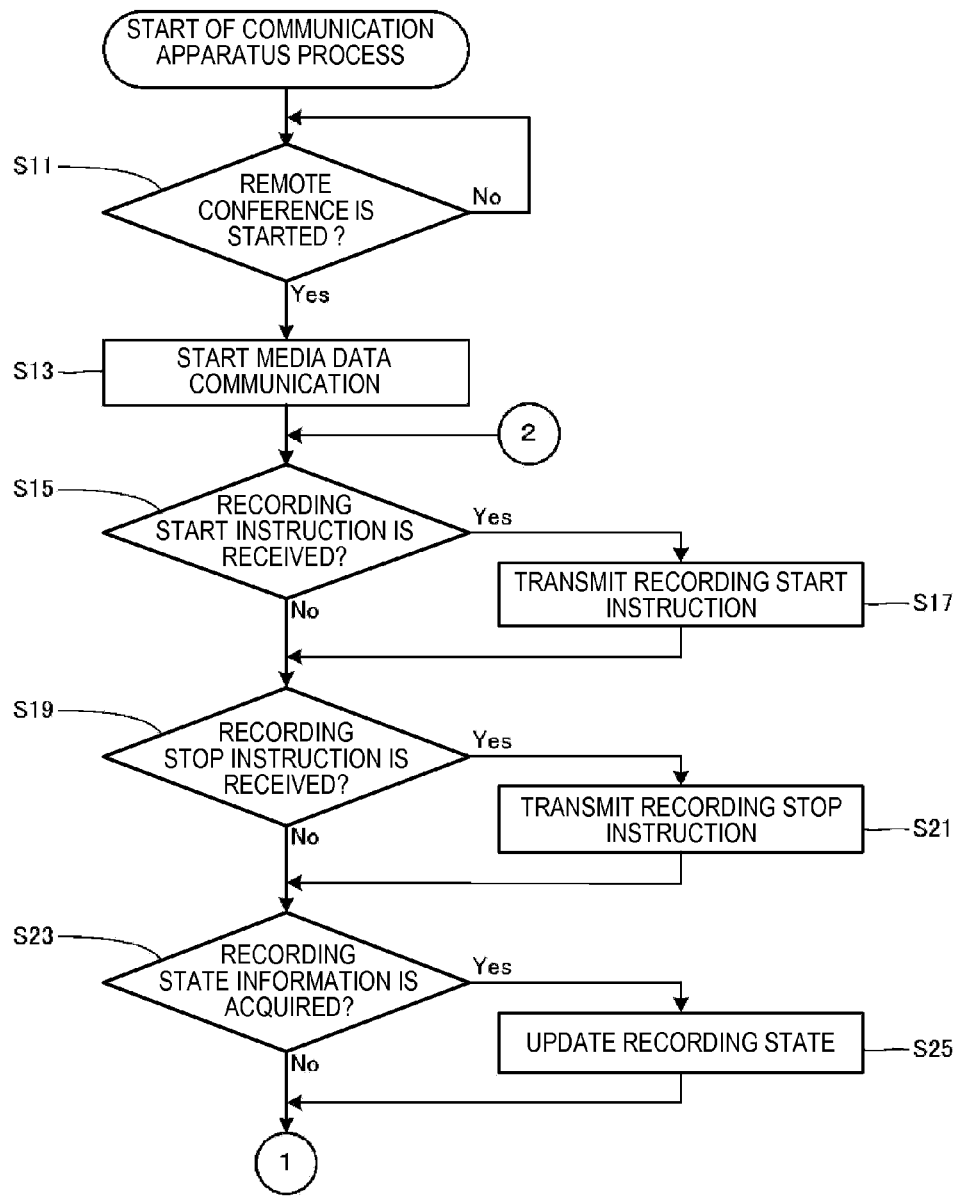
FIG. 6 is a flow chart showing a first portion of a communication apparatus process.

The communication apparatus process which is performed in each of the communication apparatuses 50A, 50B and 50C during a remote conference will be described with reference to FIGS. 6 and 7. In Step S11, the CPU 52 of each of the communication apparatuses 50A, 50B and 50C determines whether a remote conference session is established between the communication apparatus and the server apparatus 20, and the remote conference is started. In the remote conference system 10, for example, before the scheduled date and time of the remote conference, an electronic mail addressed to electronic mail addresses corresponding respectively to the communication apparatuses 50A, 50B and 50C scheduled to participate in the remote conference is transmitted from the server apparatus 20 to the communication apparatuses 50A, 50B and 50C. This electronic mail includes a uniform resource locator (URL) for the remote conference to be performed by the communication apparatuses 50A, 50B and 50C. This URL is unique for each conference room of the remote conference. In other words, the URL includes the conference ID of the remote conference. The users of the communication apparatuses 50A, 50B and 50C operate the communication apparatuses 50A, 50B and 50C at the scheduled date and time of the remote conference. In Step S11, the CPU 52 accesses the server apparatus 20 based on the above-described URL, and establishes a remote conference session with the server apparatus 20.

If a session with the server apparatus 20 is not established, and thus the remote conference is not started ("No" in Step S11), the CPU 52 repeatedly performs the determination of Step S11. If a session with the server apparatus 20 is established and the remote conference is started ("Yes" in Step S11), in Step S13, the CPU 52 starts media data communication with the server apparatus 20 through the communication device 70. If media data is transmitted from the communication device 70 of each of the communication apparatuses 50A, 50B and 50C to the server apparatus 20, an apparatus ID identifying the communication apparatus is also transmitted together with the media data.

Image data which is transmitted as media data from the communication device 70 to the server apparatus 20, and image data which is transmitted as media data from the server apparatus 20 and is received by the communication device 70 are the above-described respective image data. For example, image data generated by each of the communication apparatuses 50A, 50B and 50C is continuously transmitted from the communication device 70 of each of the communication apparatuses 50A, 50B and 50C to the server apparatus 20 until the remote conference ends. The server apparatus 20 receives the image data from the communication apparatuses 50A, 50B and 50C, and continuously transmits the image data received from the respective apparatuses 50, to each of the communication apparatuses 50A, 50B and 50C. The communication devices 70 of the communication apparatuses 50A, 50B and 50C continuously receive the image data.

If a user of any one communication apparatus 50 of the communication apparatuses 50A, 50B and 50C operates the operation unit 64 and presses the material sharing button 92, whereby an input to the material sharing button 92 is received, material data corresponding to the material 14 which is a sharing object is transmitted from the communication device 70 of the communication apparatus 50 which receives the operation, to the server apparatus 20. Before or after pressing of the material sharing button 92, the user operates the operation unit 64 to designate material data to be transmitted. The server apparatus 20 receives the material data, and transmits the material data to each of the communication apparatuses 50A, 50B and 50C. The communication device 70 of the communication apparatus 50 receives the material data.

If the chat service is used, chat data corresponding to input characters is transmitted from the communication device 70 of the communication apparatus 50 which receives character input, to the server apparatus 20. The server apparatus 20 receives the chat data, and transmits the character data to each of the communication apparatuses 50A, 50B and 50C. The communication devices 70 of the communication apparatuses 50A, 50B and 50C receive the chat data. The server apparatus 20 transmits list data to each of the communication apparatuses 50A, 50B and 50C. The communication devices 70 of the communication apparatuses 50A, 50B and 50C receive the list data.

In the communication apparatuses 50A, 50B and 50C, the CPU 52 acquires the media data from the server apparatus 20 through the communication device 70, and outputs an instruction for displaying a remote conference screen 80 having image information appropriately arranged according to a layout information selected by the communication apparatus 50A, 50B or 50C, to the display 62 according to the acquired media data. In the display 62, the remote conference screen 80 corresponding to the instruction is displayed. For example, at the time of start of the remote conference, as the layout information, layout information predetermined in the server apparatus 20 is automatically selected at session establishment. Before start of the remote conference, layout identification information of the communication apparatuses 50A, 50B and 50C may be registered in the server apparatus 20 in advance. In this case, in each of the communication apparatuses 50A, 50B and 50C, layout information corresponding to the layout identification information registered in advance is automatically selected at session establishment. When changing the layout information, the user of each of the communication apparatuses 50A, 50B and 50C performs a predetermined operation for changing on the operation unit 64 of the communication apparatuses 50A, 50B and 50C, thereby designating new layout identification information. If inputs corresponding to the above-described operations are received by the operation unit 64, the CPU 52 performs processes for changing the remote conference screen 80 based on layout information corresponding to the new layout identification information received by the operation unit 64. The CPU 52 stores the layout identification information identifying the layout information designating the current layout of the image information, in the storage device 56 to manage the layout identification information.

After starting media data communication in Step S13, in Step S15, the CPU 52 determines whether a recording start instruction is received. If the user of the communication apparatus 50 presses the recording start button 94 through the operation unit 64, a recording start instruction is input. If a recording start instruction due to pressing of the recording start button 94 is received ("Yes" in Step S15), in Step S17, the CPU 52 outputs an instruction for transmitting the recording start instruction to the server apparatus 20, to the communication device 70. As a result, the recording start instruction is transmitted from the communication device 70 to the server apparatus 20.

If the recording start button 94 is not pressed, and thus any recording start instruction is not received ("No" in Step S15), or after Step S17 is performed, in Step S19, the CPU 52 determines whether a recording stop instruction is received. If the user of the communication apparatus 50 presses the recording stop button 96 through the operation unit 64, a recording stop instruction is input. If a recording stop instruction due to pressing of the recording stop button 96 is received ("Yes" in Step S19), in Step S21, the CPU 52 outputs an instruction for transmitting the recording stop instruction to the server apparatus 20, to the communication device 70. As a result, the recording stop instruction is transmitted from the communication device 70 to the server apparatus 20.

If the recording stop button 96 is not pressed, and thus any recording stop instruction is not received ("No" in Step S19), or after Step S21 is performed, in Step S23, the CPU 52 determines whether recording state information is acquired. The recording state information is information representing that recording of the remote conference is being performed or not performed. Recording state information representing "Recording" is transmitted from the server apparatus 20 in Step S59 of FIG. 8 to be described below. Recording state information representing "Non-Recording" is transmitted from the server apparatus 20 in Step S65 of FIG. 8 to be described below. In the communication apparatus 50, the recording state information is received by the communication device 70. The CPU 52 acquires the recording state information through the communication device 70, and stores the recording state information in the RAM 58.

If the recording state information is acquired ("Yes" in Step S23), in Step S25, the CPU 52 updates the recording state managed in the RAM 58, according to the new recording state information stored in the RAM 58. With respect to the recording state which is managed in the communication apparatus 50, an initial value is set to "Non-Recording". If recording state information representing "Recording" is acquired in a state where the recording state is "Non-Recording", the CPU 52 updates the recording state managed in the RAM 58, with "Recording". If recording state information representing "Non-Recording" is acquired in a state where the recording state is "Recording", the CPU 52 updates the recording state managed in the RAM 58, with "Non-Recording". If "Non-Recording" is received as the recording state information in a state where recording of image information designated by a generation start instruction in Step S35 of FIG. 7 (to be described below) is started based on the generation start instruction, the CPU 52 stops the recording of the image information designated by the generation start instruction.

Figure 7:
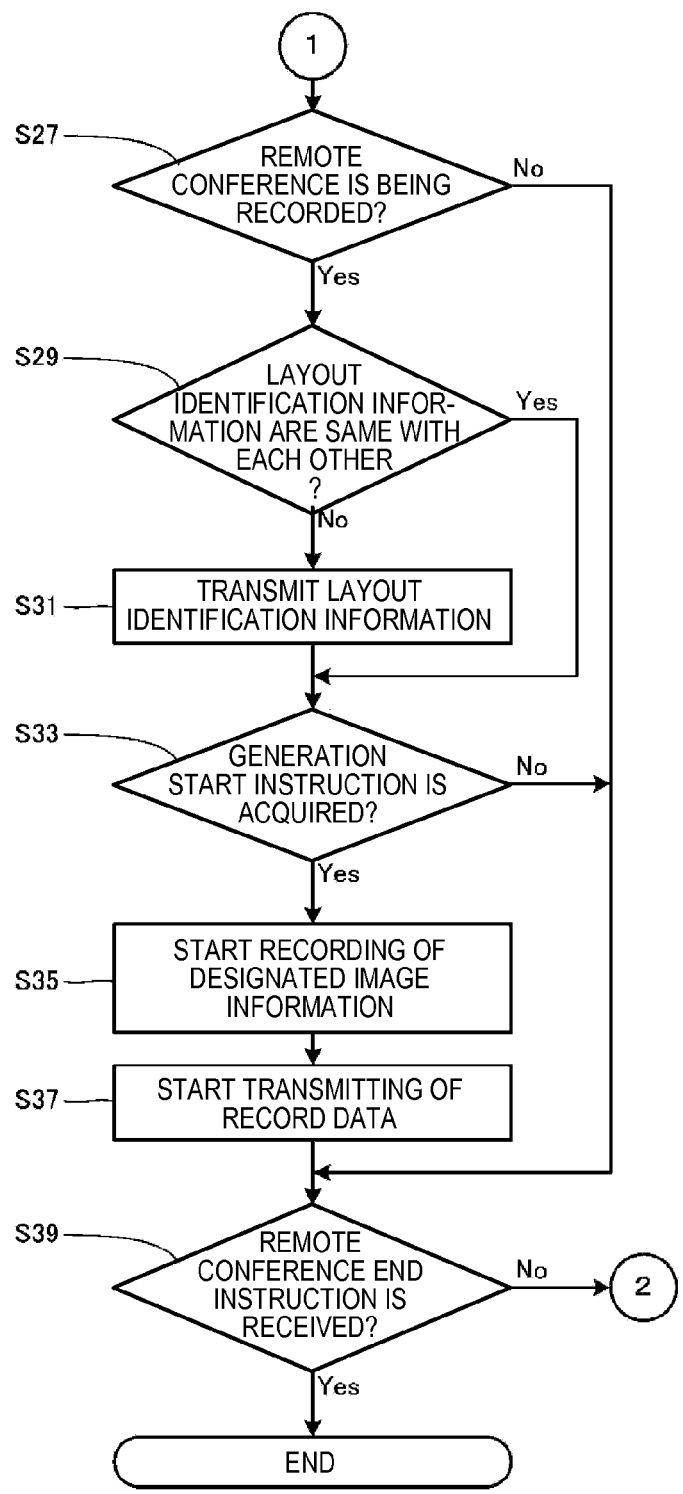
FIG. 7 is a flow chart showing a second portion of the communication apparatus process.

If any recording state information is acquired ("No" in Step S23), or after Step S25 is performed, the CPU 52 advances the process to Step S27 of FIG. 7 in which the CPU 52 determines whether the remote conference is being recorded. The CPU 52 performs this determination according to the registration state of the recording state managed in the RAM 58. If the registration state of the recording state is "Non-Recording" and is not "Recording" ("No" in Step S27), the CPU 52 advances the process to Step S39.

If the registration state of the recording state is "Recording" ("Yes" in Step S27), in Step S29, the CPU 52 determines whether two layout identification information which are management objects are same as each other. In the communication apparatus 50A, 50B or 50C, as described above, layout identification information identifying layout information designating the current layout of the image information is stored and managed in the storage device 56.

Also, in the communication apparatus 50A, 50B or 50C, layout identification information transmitted to the server apparatus 20 in Step S31 (to be described below) performed in the previous time before Step S29 performed this time is stored and managed in the storage device 56, separately from the above-described layout identification information based on designation of the current layout of the image information. The CPU 52 compares the two layout identification information managed as described above, thereby performing the determination of Step S29. The CPU 52 may store and manage the above described two layout identification information in the RAM 58.

If the two layout identification information are not same as each other ("No" in Step S29), in Step S31, the CPU 52 outputs an instruction for transmitting layout identification information identifying layout information corresponding to the current layout of image information, to the server apparatus 20, to the communication device 70. As a result, the above-described layout identification information is transmitted from the communication device 70 to the server apparatus 20. If the layout identification information is transmitted from the communication device 70 to the server apparatus 20, an apparatus ID identifying the corresponding communication apparatus is also transmitted together with the layout identification information. If Step S29 is performed for the first time after the start of the remote conference, Step S31 is not performed, and thus in the communication apparatus 50, any layout identification information having been transmitted is not stored. In this case also, the CPU 52 determines "No" in Step S29 ("No" in Step S29), and performs Step S31 as described above. Thereafter, as described above, the CPU 52 stores the transmitted layout identification information in the storage device 56.

After Step S31 is performed, in Step S33, the CPU 52 determines whether a generation start instruction is acquired. A generation start instruction is transmitted from the server apparatus 20 in Step S77 of FIG. 9 to be described below. In the communication apparatus 50, a generation start instruction is received by the communication device 70, and the CPU 52 acquires the generation start instruction through the communication device 70. If a generation start instruction is acquired ("Yes" in Step S33), in Step S35, the CPU 52 starts recording of image information designated by the generation start instruction. As a result, in the communication apparatus 50, record data corresponding to the image information designated by the generation start instruction is generated. For example, it is assumed a case where a remote conference screen 80 corresponding to the second layout information (see FIG. 4) is displayed on the display 62, and the unshared chat information 15N is designated by the generation start instruction. In this case, the CPU 52 starts recording of the personal area 88 where the unshared chat information 15N is displayed, and generates record data corresponding to the personal area 88.

In Step S37, the CPU 52 starts transmitting of the record data sequentially generated after the start of the recording. As a result, the record data is transmitted from the communication device 70 to the server apparatus 20. When the record data is transmitted from the communication apparatus 50 to the server apparatus 20, the apparatus ID identifying the communication apparatus 50 is also transmitted together with the record data. Transmitting of the record data and the apparatus ID continues while the recording counties. Thereafter, in Step S39, the CPU 52 determines whether a remote conference end instruction is received. If the user of the communication apparatus 50 presses the conference end button 98 through the operation unit 64, a remote conference end instruction is input. If the conference end button 98 is not pressed, and thus any remote conference end instruction is not received ("No" in Step S39), the CPU 52 returns the process to Step S15 of FIG. 6, and performs the processes of Step S15 and the subsequent Steps. If a remote conference end instruction due to pressing of the conference end button 98 is received ("Yes" in Step S39), the CPU 52 interrupts the session with the server apparatus 20, and ends the communication apparatus process.

<Server Apparatus Process>

Figure 8:
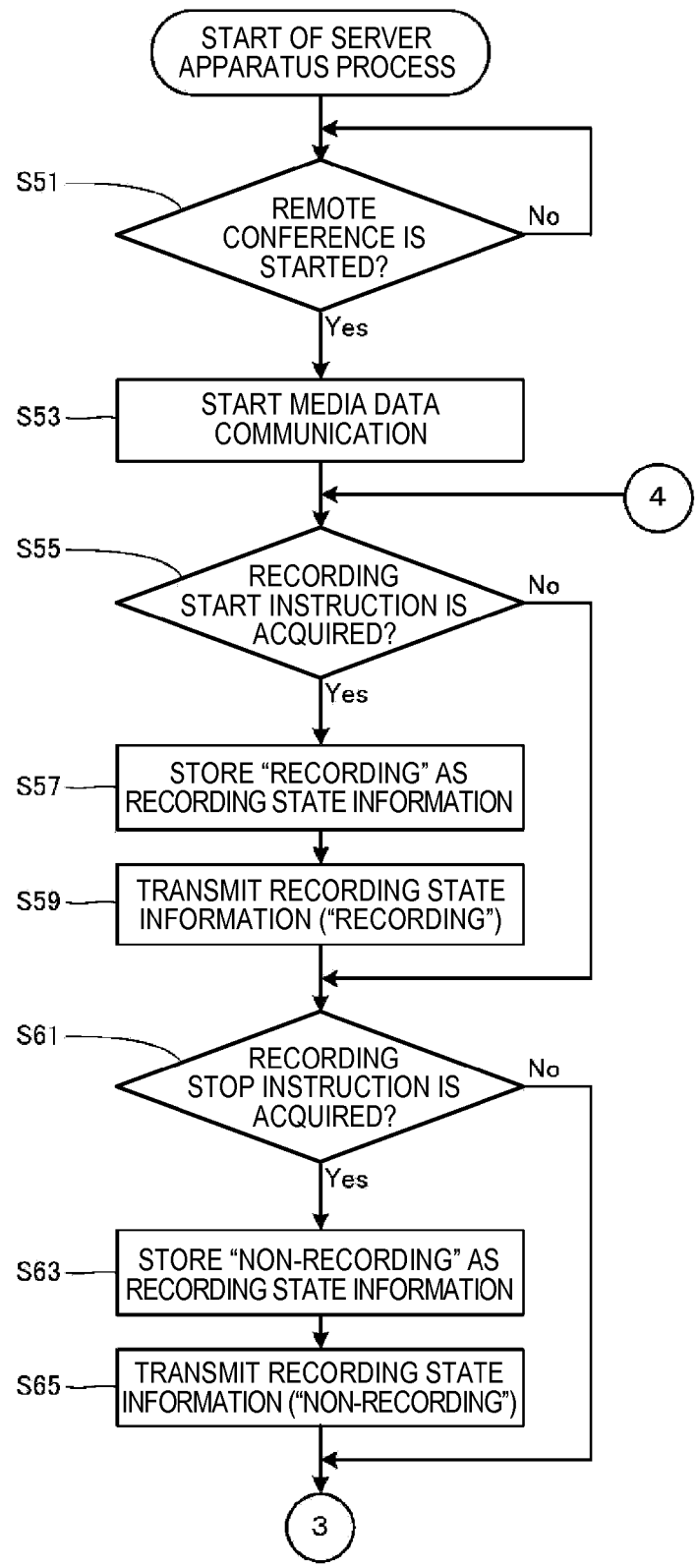
FIG. 8 is a flow chart showing a first portion of a server process.

A server apparatus process which is performed by the server apparatus 20 when the remote conference is performed by the communication apparatuses 50A, 50B and 50C will be described with reference to FIGS. 8 and 9. In Step S51, the CPU 22 determines whether the remote conference is started. If sessions with the communication apparatuses 50 are not established, and thus the remote conference is not started ("No" in Step S51), the CPU 22 repeatedly performs Step S51. The remote conference by the communication apparatuses 50A, 50B and 50C is performed in a state where sessions with all communication apparatuses 50A, 50B and 50C are established. If remote conference sessions with the communication apparatuses 50 which are access sources are established based on access from the communication apparatuses 50 described in association with Step S11 of FIG. 6, the CPU 22 determines that the remote conference is started ("Yes" in Step S51). The CPU 22 stores the conference ID included in information transmitted from the communication apparatuses 50 during access, and apparatus IDs identifying the communication apparatuses 50 having accessed, in association with each other, in the RAM 28. Subsequently, in Step S53, the CPU 22 starts media data communication with the communication apparatuses 50 having established the sessions. The CPU 22 transmits the media data received from a communication apparatus 50, to all communication apparatuses 50 associated with the conference ID associated with the apparatus ID of the communication apparatus 50 which is the transmission sources of the media data.

Thereafter, in Step S55, the CPU 22 determines whether a recording start instruction is acquired. A recording start instruction is transmitted from any one communication apparatus 50 of the communication apparatuses 50A, 50B and 50C in Step S17 of FIG. 6 described above. In the server apparatus 20, the recording start instruction is received by the communication device 32, and the CPU 22 acquires the recording start instruction through the communication device 32. If the recording start instruction is acquired ("Yes" in Step S55), the CPU 22 stores "Recording" as the recording state information. The recording state information is stored and managed in the RAM 28. With respect to the recording state which is managed in the server apparatus 20, an initial value is set to "Non-Recording". If the recording state information representing "Non-Recording" is stored in the RAM 28, the recording state information is updated with "Recording". Subsequently, in Step S59, the CPU 22 outputs an instruction for transmitting the recording state information representing "Recording", to all communication apparatuses 50 associated with the conference ID associated with the apparatus ID of the communication apparatus 50 having transmitted the recording start instruction, to the communication device 32. In this illustrative embodiment, the recording state information representing "Recording" is transmitted from the communication device 32 to each of the communication apparatuses 50A, 50B and 50C.

If any recording start instruction is not acquired ("No" in Step S55), or after Step S59 is performed, in Step S61, the CPU 22 determines whether a recording stop instruction is acquired. A recording stop instruction is transmitted from any one communication apparatus 50 of the communication apparatuses 50A, 50B and 50C in Step S21 of FIG. 6 described above. In the server apparatus 20, a recording stop instruction is received by the communication device 32, and the CPU 22 acquires the recording stop instruction through the communication device 32. If a recording stop instruction is acquired ("Yes" in Step S61), the CPU 22 stores "Non-Recording" as the recording state information. If recording state information representing "Recording" is stored in the RAM 28, the recording state information is updated with "Non-Recording". Subsequently, in Step S59, the CPU 22 outputs an instruction for transmitting the recording state information representing "Non-Recording", to all communication apparatuses 50 associated with the conference ID associated with the apparatus ID of the communication apparatus 50 having transmitted the recording stop instruction, to the communication device 32. In this illustrative embodiment, the recording state information representing "Non-Recording" is transmitted from the communication device 32 to each of the communication apparatuses 50A, 50B and 50C.

Figure 9:
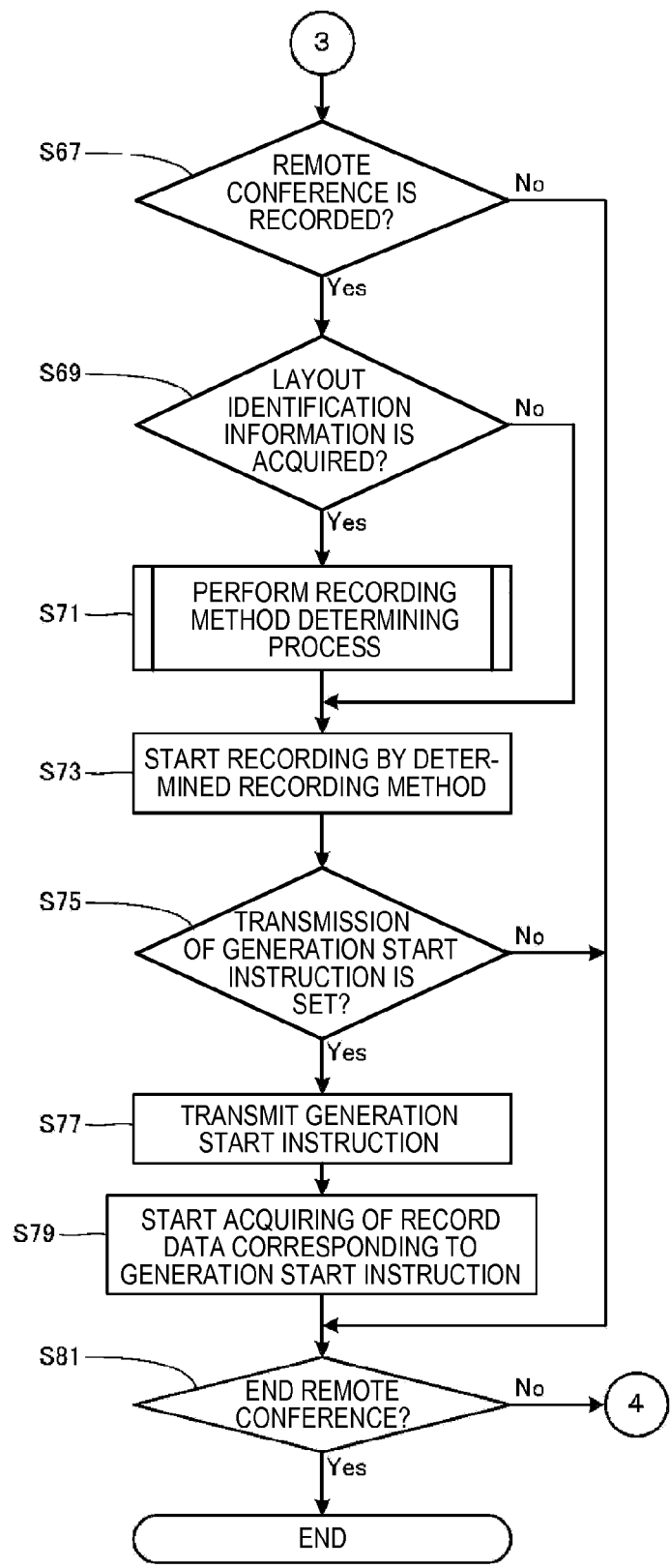
FIG. 9 is a flow chart showing a second portion of the server process.

If any recording stop instruction is acquired ("No" in Step S61), or after Step S65 is performed, the CPU 22 advances the process to Step S67 of FIG. 9 in which the CPU 22 determines whether the remote conference is being recorded. The CPU 22 performs this determination according to the registration state of the recording state managed in the RAM 28. If the registration state of the recording state is "Non-Recording" and is not "Recording" ("No" in Step S67), the CPU 22 advances the process to Step S81. If the registration state of the recording state is "Recording" ("Yes" in Step S67), in Step S69, the CPU 22 determines whether layout identification information is acquired. Layout identification information is transmitted from the communication apparatus 50 (a part or all of the communication apparatuses 50A, 50B and 50C) in which it is determined in Step S31 of FIG. 7 that layout identification information are not same as each other ("No" in Step S31), together with an apparatus ID identifying the corresponding communication apparatus 50. In the server apparatus 20, the layout identification information and the apparatus ID are received by the communication device 32, and the CPU 22 acquires the layout identification information and the apparatus ID through the communication device 32.

If layout identification information is acquired from any one communication apparatus 50 of the communication apparatuses 50A, 50B and 50C by the communication device 32 ("Yes" in Step S69), in Step S71, the CPU 22 performs a recording method determining process. The recording method determining process will be described below. The acquired layout identification information, and the apparatus ID acquired together with that layout identification information are registered and managed in the layout table stored in the RAM 28, in association with the conference ID representing the remote conference which is being performed (see FIG. 10). It is noted that registration states in the layout table shown in FIG. 10 are merely illustrative. After the recording method determining process is performed, in Step S73, the CPU 22 starts recording of the remote conference by a recording method determined by the recording method determining process. As a result, record data corresponding to a display area within the remote conference screen 80 is generated by the recording method determined by the recording method determining process. The generated record data is stored in the storage device 26, in association with the conference ID representing the remote conference which is being performed.

Figure 11:
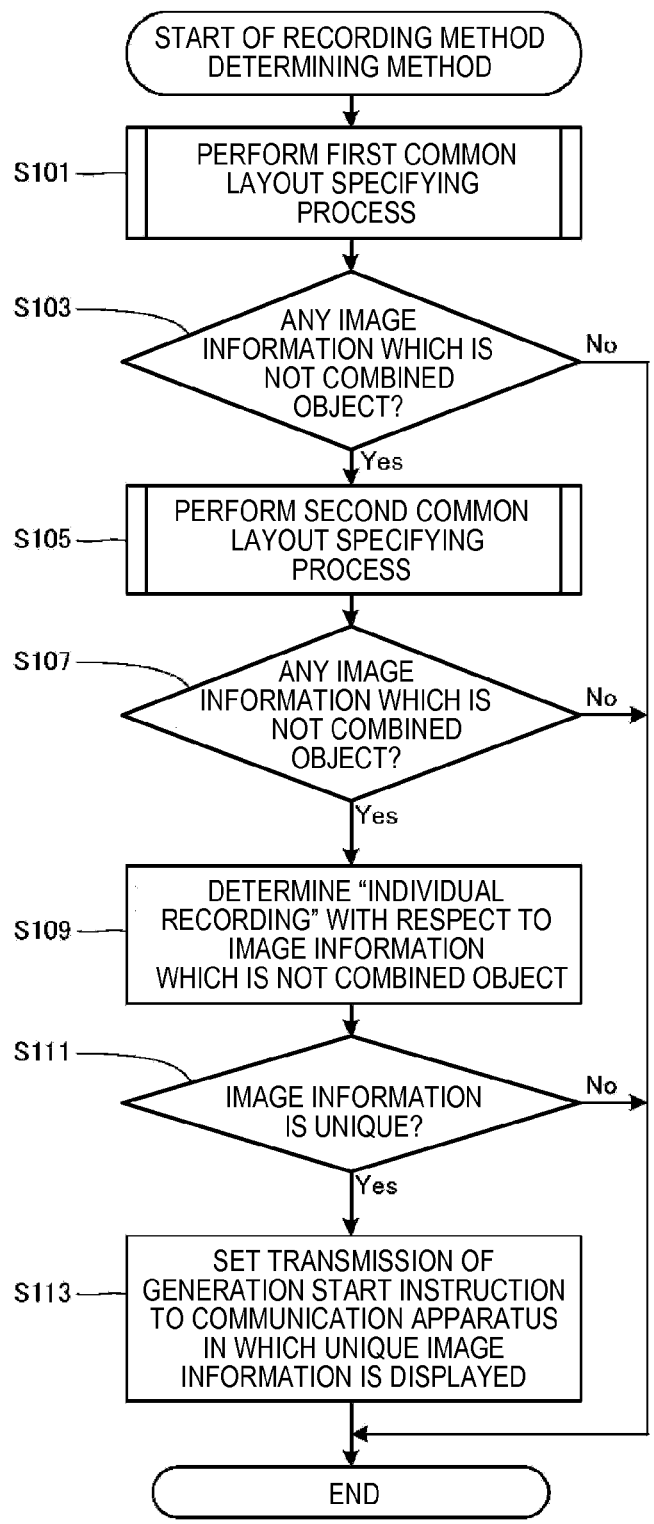
FIG. 11 is a flow chart of a recording method determining process.

Subsequently, in Step S75, the CPU 22 determines whether transmission of a generation start instruction is set. Transmission of a generation start instruction is set in Step S113 of FIG. 11 to be described below. If transmission of a generation start instruction is set ("Yes" in Step S75), in Step S77, the CPU 22 outputs an instruction for transmitting the generation start instruction to the communication apparatus 50 which is the transmission destination of the generation start instruction, to the communication device 32. The CPU 22 specifies a communication apparatus 50 which is the transmission destination, based on the apparatus ID included in the generation start instruction. As a result, the generation start instruction set in Step S113 of FIG. 11 is transmitted from the communication device 32 to the communication apparatus 50 which is the transmission destination. Thereafter, in Step S79, the CPU 22 starts acquiring of record data which is transmitted from the communication apparatus 50 to which the generation start instruction is transmitted. The record data is continuously transmitted from the communication apparatus 50 in Step S37 of FIG. 7, and is sequentially received by the communication device 32. The CPU 22 acquires the record data through the communication device 32. The acquired record data is stored in storage device 26, in association with the apparatus ID received together with the record data and the conference ID representing the remote conference which is being performed. Acquiring and storing of the record data continues accordingly to transmission of the record data.

If transmission of a generation start instruction is not set ("No" in Step S75), or after Step S79 is performed, in Step S81, the CPU 22 determines whether to end the remote conference. End of the remote conference is determined according to whether interruption of the sessions due to reception of a remote conference end instruction (see "Yes" in Step S39 of FIG. 7) is performed between the server apparatus 20 and the communication apparatuses 50. If at least one of the sessions with the communication apparatuses 50A, 50B and 50C is established, the CPU 22 determines "No" in Step S81 ("No" in Step S81). In this case, the CPU 22 returns the process to Step S55 of FIG. 8, and performs the processes of Step S55 and the subsequent Steps. If all of the sessions with the communication apparatuses 50A, 50B and 50C are interrupted, the CPU 22 determines "Yes" in Step S81 ("Yes" in Step S81) and ends the server apparatus process. At end of the server apparatus process, the CPU 22 deletes the conference ID of the current remote conference and the apparatus IDs associated with that conference ID which are stored in the RAM 28 during session establishment.

<Recording Method Determining Process>

The recording method determining process which is performed in Step S71 of FIG. 9 will be described with reference to FIG. 11. In Step S101, the CPU 22 performs a first common layout specifying process. The first common layout specifying process will be described below. After the first common layout specifying process is performed, in Step S103, the CPU 22 determines whether there is any image information which is not set as a combined object in the first common layout specifying process and thus is not a combined object. If there is no image information which is not set as a combined object in the first common layout specifying process and thus is not a combined object ("No" in Step S103), the CPU 22 ends the recording method determining process. Unlike in FIG. 10, if the layout identification information registered in the layout table are the same among all communication apparatuses 50, the result of Step S103 is negative ("No" in Step S103). In this case, the recording method which is determined in the recording method determining process is determined to a combined recording in Step S141 of FIG. 12 (to be described below). Specifically, the recording method is determined to a method of combining a plurality of image data corresponding respectively to a plurality of image information included in the remote conference screens 80 in a state where all of the plurality of image information are arranged according to the layout information corresponding to the layout identification information, thereby performing recording. In Step S73 of FIG. 9 described above, generation of record data equivalent to the remote conference screens 80 being displayed on the respective displays 62 of the communication apparatuses 50A, 50B and 50C is started.

If there is image information which is not set as a combined object in the first common layout specifying process and thus is not a combined object ("Yes" in Step S103), the CPU 22 performs a second common layout specifying process. The second common layout specifying process is performed with respect to image information not set as a combined object in the first common layout specifying process of Step S101. The second common layout specifying process will be described below. After the second common layout specifying process is performed, in Step S107, the CPU 22 determines whether there is any image information which is not set as a combined object in the second common layout specifying process and thus is not a combined object. If there is no image information which is not set as a combined object in the second common layout specifying process and thus is not a combined object ("No" in Step S107), the CPU 22 ends the recording method determining process. In this case, the recording method which is determined in the recording method determining process is determined to a method according to the result (see "No" in Step S133 of FIG. 12, or Step S141) of the first common layout specifying process (see FIG. 12) to be described below and the result (see "No" in Step S163 of FIG. 13, or Step S171) of the second common layout specifying process (see FIG. 13). A specific example will be described below.

If there is image information which is not set as a combined object in the second common layout specifying process and thus is not a combined object ("Yes" in Step S107), the CPU 22 determines a recording method "Individual Recording", with respect to the image information which is not a combined object. "Individual Recording" is a recording method of individually generating record data corresponding to one image information, without combined with any other image information. Subsequently, in Step S111, the CPU 22 determines whether the image information for which "Individual Recording" is determined as the recording method is image information unique for a communication apparatus 50 in which a remote conference screen 80 including the corresponding image information is being displayed. Unique image information is image information which is being displayed only by one communication apparatus 50 of the communication apparatuses 50A, 50B and 50C participating in the remote conference. Here, it is assumed that the layout table is in the state shown in FIG. 10, and the first layout identification information and the second layout identification information correspond to FIG. 3 and FIG. 4, respectively, as described above. In this case, the shared chat information 15S and the unshared chat information 15N are image information included only in the remote conference screen 80 which is displayed on the display 62 of the communication apparatus 50B. Therefore, the shared chat information 15S and the unshared chat information 15N correspond to unique image information. The unshared chat information 15N is chat information 15 according to a personal input before sharing, and thus can be always treated as corresponding to unique image information. Meanwhile, the shared chat information 15S may be displayed also in any other communication apparatus 50 due to a change in the layout information during the remote conference (see "No" in Step S29 of FIG. 7). Therefore, the shared chat information 15S may be treated as not corresponding to unique image information. This treat is the same even with respect to the other image information exemplified in this illustrative embodiment, except for the unshared chat information 15N. Whether to treat any image information as unique image information can be appropriately determined in view of various conditions.

If the image information for which "Individual Recording" is determined as the recording method is not unique image information ("No" in Step S111), the CPU 22 ends the recording method determining process. If there is a plurality of image information for which "Individual Recording" is determined as the recording method, it is determined whether all of the image information are unique image information. If at least one image information is not unique image information, the result of Step S111 becomes negative ("No" in Step S111). In this case, the recording method which is determined in the recording method determining process is determined to a method according to the result (see "No" in Step S133 of FIG. 12, or Step S141) of the first common layout specifying process (see FIG. 12) to be described below and the result (see "No" in Step S163 of FIG. 13, or Step S171) of the second common layout specifying process (see FIG. 13), and to a method according to "Individual Recording" of Step S109 for image information which is not set as a combined object in the second common layout specifying process and thus is not a combined object. Specific examples of the method according to the set result in Step S141 of FIG. 12, and the set result in Step S171 of FIG. 13 will be described below.

If the image information for which "Individual Recording" is determined as the recording method is unique image information ("Yes" in Step S111), in Step S113, the CPU 22 sets transmission of a generation start instruction to a communication apparatus 50 in which the remote conference screen 80 including the unique image information is being displayed. Thereafter, the CPU 22 generates a generation start instruction for the communication apparatus 50 in which the remote conference screen 80 including the unique image information is being displayed. The generated generation start instruction includes designation of the unique image information, as image information to be recorded. Also, the generation start instruction includes the apparatus ID of the communication apparatus 50 in which the remote conference screen 80 including the unique image information is being displayed. In this case, the recording method which is determined in the recording method determining process is determined to a method according to the result (see "No" in Step S133 of FIG. 12, or Step S141) of the first common layout specifying process (see FIG. 12) to be described below and the result (see "No" in Step S163 of FIG. 13, or Step S171) of the second common layout specifying process (see FIG. 13), and transmission of the generation start instruction is set. A specific examples of the method according to the set result in Step S141 of FIG. 12 and the set result in Step S171 of FIG. 13 will be described below. After performing Step S113, the CPU 22 ends the recording method determining process.

If the result of Step S111 becomes positive ("Yes" in Step S111) since there is a plurality of image information for which "Individual Recording" is determined as the recording method and at least one of them is unique image information, Step S113 is performed with respect to every image information which is unique image information. If there is a plurality of unique image information, a generation start instruction corresponding to each image information is set. In a case where there is a plurality of image information for which "Individual Recording" is determined as a recording method, if at least one image information of them is not unique image information, as a recording method for each image information which is not unique image information, "Individual Recording" determined in Step S109 is maintained.

<First Common Layout Specifying Process>

The first common layout specifying process which is performed in Step S101 of FIG. 11 will be described with reference to FIG. 12. In Step S131, the CPU 22 specifies a display area where the layouts of two or more image information of the plurality of image information of the remote conference screens 80 being displayed on the displays 62 of all communication apparatuses 50A, 50B and 50C being used in the remote conference are same (corresponding to each other) among all communication apparatuses 50.

For example, it is assumed that the layout table is in the registration state shown in FIG. 10. Based on the first layout identification information associated with the apparatus IDs of the communication apparatuses 50A and 50C, and the second layout identification information associated with the apparatus ID of the communication apparatus 50B, the CPU 22 recognizes that the layouts of the plurality of image information are in the states of the remote conference screens 80 shown respectively in FIGS. 3 and 4. In the remote conference screens 80 shown respectively in FIGS. 3 and 4, the layouts of the capture images 13A, 13B and 13C and the material 14 are the same. Therefore, in Step S131, the CPU 22 specifies a display area including the image information area 82 displaying the capture images 13A, 13B and 13C, and the image information area 84 displaying the material 14. It is possible to smoothly specify the same display area based on the layout identification information.

In Step S133, the CPU 22 determines whether any same display area is specified in Step S131. If any same display area is not specified in Step S131 ("No" in Step S133), the CPU 22 ends the first common layout specifying process. In this case, in the first common layout specifying process, no recording method is determined. For example, if the first layout identification information is registered in association with the apparatus ID of the communication apparatus 50A, and the second layout identification information is registered in association with the apparatus ID of the communication apparatus 50B, and the third layout identification information is registered in association with the apparatus ID of the communication apparatus 50C, the result of Step S133 becomes negative ("No" in Step S133).

If the same display area is specified in Step S131 ("Yes" in Step S133), in Step S135, the CPU 22 counts the number of image information which are not included in the display area specified in Step S131. Image information which is not included in the display area specified in Step S131 is image information which is included in a display area in which layouts of two or more image information of the plurality of image information of the remote conference screens 80 are not the same among all communication apparatus 50A, 50B and 50C. The number of same image information having the same display form among the communication apparatuses 50A, 50B and 50C is counted as "1". Subsequently, in Step S137, the CPU 22 adds the number "1" of record data corresponding to the display area specified in Step S131, to the number counted in Step S135, thereby acquiring the number of record data. As described above, for example, if the layout table is in the registration state shown in FIG. 10, in Step S135, "3" (the shared chat information 15S, the unshared chat information 15N, and the participant list 16) is counted as the number of image information which are not included in the display area specified in Step S131. In Step S137, the number "1" of record data corresponding to the display area specified in Step S131 is added to the number "3" acquired in Step S135, whereby the number "4" of record data is acquired.

In Step S139, the CPU 22 determines whether the number of record data acquired in Step S137 is less than a first reference number. The first reference number is a number corresponding to the number of image information which are included in the remote conference screens 80 being displayed on the displays 62 of the communication apparatuses 50A, 50B and 50C. The number of same image information having the same display form among the communication apparatuses 50A, 50B and 50C is counted as "1". With respect to determination of the first reference number, a case where the layout table is in the registration state shown in FIG. 10 as described above will be described as an example. In the remote conference screen 80 (see FIG. 3) corresponding to the first layout identification information, the capture images 13A, 13B and 13C, the material 14, and the participant list 16 are included. In the remote conference screen 80 (see FIG. 4) corresponding to the second layout identification information, the capture images 13A, 13B and 13C, the material 14, the shared chat information 15S, and the unshared chat information 15N are included. The display form of the capture images 13A, 13B and 13C included in the remote conference screen 80 of FIG. 3, and the display form of the capture images 13A, 13B and 13C included in the remote conference screen 80 of FIG. 4 are the same. The display form of the material 14 included in the remote conference screen 80 of FIG. 3, and the display form of the material 14 included in the remote conference screen 80 of FIG. 4 are the same. Therefore, the remote conference screens 80 shown in FIGS. 3 and 4 include the capture images 13A, 13B and 13C, the material 14, the shared chat information 15S, the unshared chat information 15N, and the participant list 16, and thus the total number of image information is 7. Accordingly, the first reference number is counted as "7".

If the number of record data acquired in Step S137 is less than the first reference number ("Yes" in Step S139), in Step S141, the CPU 22 determines the recording method "Combined Recording", with respect to the two or more image information included in the display area specified in Step S131. "Combined Recording" of Step S141 is a recording method of combining two or more image data corresponding respectively to the two or more image information included in the display area specified in Step S131, thereby generating one record data corresponding to the two or more image information included in the display area specified in Step S131. The positional relationship between the image information in the record data is the same as the layouts of the remote conference screens 80. For example, it is assumed that as described above, in Step S131, the display area including the image information area 82 displaying the capture images 13A, 13B and 13C and the image information area 84 displaying the material 14 is specified. In this case, in Step S141, the combined recording is determined as a recording method. The combined recording combines image data corresponding respectively to the capture images 13A, 13B and 13C and material data corresponding to the material 14, so as to generating one record data.

If the number of record data acquired in Step S137 is not less than the first reference number ("No" in Step S139), or after Step S141 is performed, the CPU 22 ends the first common layout specifying process. If the result of Step S139 is negative ("No" in Step S139), since Step S141 is not performed, in the first common layout specifying process, no recording method is determined.

<Second Common Layout Specifying Process>

The second common layout specifying process which is performed in Step S105 of FIG. 11 will be described with reference to FIG. 13. In the second common layout specifying process, image information which is not a combined object and is a cause of the positive result of Step S103 of FIG. 11 ("Yes" in Step S103) becomes a process target. The following description will be made on this assumption. In Step S161, the CPU 22 specifies a display area in which the layouts of two or more image information of the plurality of image data of the remote conference screens 80 being displayed on the displays 62 of two or more communication apparatuses 50 of all communication apparatuses 50A, 50B and 50C are not the same among the above described two ore more communication apparatuses 50. In this illustrative embodiment in which communication apparatuses 50 which are used in the remote conference are three apparatuses of the communication apparatuses 50A, 50B and 50C, a display area which is not the same between any two of the communication apparatuses 50A, 50B and 50C is specified.

For example, it is assumed that in the layout table, the first layout identification information is registered in association with the apparatus IDs of the communication apparatuses 50A and 50C, and the third layout identification information has is registered in association with the apparatus ID of the communication apparatus 50B. Also, if the registration states of the layout table are as described above, there is no display area in which the layouts of two or more image information of the plurality of image information of the remote conference screens 80 being displayed on the displays 62 of all communication apparatuses 50A, 50B and 50C are the same among all communication apparatuses 50. Therefore, in this case, in Step S131 of FIG. 12, any same display area is not specified.

Based on the first layout identification information associated with the apparatus IDs of the communication apparatuses 50A and 50C, and the third layout identification information associated with the apparatus ID of the communication apparatus 50B, the CPU 22 recognizes that the layouts of the plurality of image information are in the states of the remote conference screens 80 shown respectively in FIGS. 3 and 5. Since the remote conference screens 80 (see FIG. 3) of the communication apparatuses 50A and 50C are the same, in Step S161, the CPU 22 specifies a display area including the image information area 82 displaying the capture images 13A, 13B and 13C, the image information area 84 displaying the material 14, and the image information area 90 displaying the participant list 16. Also, from the remote conference screens 80 shown respectively in FIGS. 3 and 5, any display area in which the layouts of two or more image information are the same is not specified. It is possible to smoothly specify the same display area based on the layout identification information. The image information of the present illustrative embodiment does not include images representing the individual buttons 92 to 98.

In Step S163, the CPU 22 determines whether any same display area is specified in Step S161. If any same display area is not specified in Step S161 ("No" in Step S163), the CPU 22 ends the second common layout specifying process. In this case, in the second common layout specifying process, no recording method is specified.

If the same display area is specified in Step S161 ("Yes" in Step S163), in Step S165, the CPU 22 counts the number of image information which are not included in the display area specified in Step S161. Image information which is not included in the display area specified in Step S161 is image information which is included in a display area in which the layouts of two or more image information of the plurality of image information of the remote conference screens 80 are not the same between any two or more communication apparatuses 50. The number of same image information having the same display form among the communication apparatuses 50A, 50B and 50C is counted as "1". Subsequently, in Step S167, the CPU 22 adds the number of record data corresponding to the display area specified in Step S161, to the number counted in Step S165, thereby acquiring the number of record data. For example, it is assumed that in the layout table, as described above, the first layout identification information is registered in association with the apparatus IDs of the communication apparatuses 50A and 50C, and the third layout identification information is registered in association with the apparatus ID of the communication apparatus 50B. In this case, in Step S165, "3" (the material 14, the shared chat information 15S, and the unshared chat information 15N) (see FIG. 5) is counted as the number of image information which are not included in the display area specified in Step S161. Also, with respect to the material 14, since the display form in the remote conference screen 80 of FIG. 3, and the display form in the remote conference screen 80 of FIG. 5 are the same, the material 14 is counted as "1" as described above. As a result, the count number becomes "3". In Step S167, the number "1" of record data corresponding to the display area specified in Step S161 is added to the number "3" acquired in Step S165, whereby the number "4" of record data is acquired.

In Step S169, the CPU 22 determines whether the number of record data acquired in Step S167 is less than a second reference number. The second reference number is a number corresponding to the number of image information which are included in the remote conference screens 80 being displayed on the displays 62 of the communication apparatuses 50A, 50B and 50C. As apparent from the above described assumption, if "Combined Recording" is determined in Step S141 of FIG. 12, in determining the second reference number, the image information which are included in the remote conference screens 80 do not include image information which are objects of "Combined Recording". The number of same image information having the same display form among the communication apparatuses 50A, 50B and 50C is counted as "1".

With respect to determination of the second reference number, a case where the first layout identification information is registered in association with the apparatus IDs of the communication apparatuses 50A and 50C, and the third layout identification information is registered in association with the communication apparatus 50B, as described above, will be described as an example. In the remote conference screen 80 (see FIG. 3) corresponding to the first layout identification information, the capture images 13A, 13B and 13C, the material 14, and the participant list 16 are included.

In the remote conference screen 80 (see FIG. 5) corresponding to the third layout identification information, the material 14, the shared chat information 15S, and the unshared chat information 15N are included. The display form of the material 14 included in the remote conference screen 80 of FIG. 3, and the display form of the material 14 included in the remote conference screen 80 of FIG. 5 are the same. Therefore, the remote conference screens 80 shown in FIGS. 3 and 5 include the capture images 13A, 13B and 13C, the material 14, the shared chat information 15S, the unshared chat information 15N, and the participant list 16. Thus, the total number of image information is 7. Accordingly, the second reference number is counted as "7".

If the number of record data acquired in Step S167 is less than the second reference number ("Yes" in Step S169), in Step S171, the CPU 22 determines a recording method "Combined Recording", with respect to the two or more image information included in the display area specified in Step S161. "Combined Recording" of Step S171 is a recording method of combining two or more image data corresponding respectively to the two or more image information included in the display area specified in Step S161, thereby generating one record data corresponding to the two or more image information included in the display area specified in Step S161. The positional relationship between the image information in the record data is the same as the layouts of the remote conference screens 80. It is assumed that as described above, in Step S161, the display area including the image information area 82 displaying the capture images 13A, 13B and 13C, and the image information area 84 displaying the material 14, and the image information area 90 displaying the participant list 16 is specified. In this case, in Step S171, the combined recording is determined as a recording method. The combined recording combines image data corresponding respectively to the capture images 13A, 13B and 13C, and material data corresponding to the material 14, and list data corresponding to the participant list 16, thereby generating one record data.

If the number of record data acquired in Step S167 is not less than the second reference number ("No" in Step S169), or after Step S171 is performed, the CPU 22 ends the second common layout specifying process. If the result of Step S169 is negative ("No" in Step S169), since Step S171 is not performed, in the second common layout specifying process, no recording method is determined.

Effects of Illustrative Embodiment

According to the above described illustrative embodiment, the following effects can be achieved.

Figure 12:
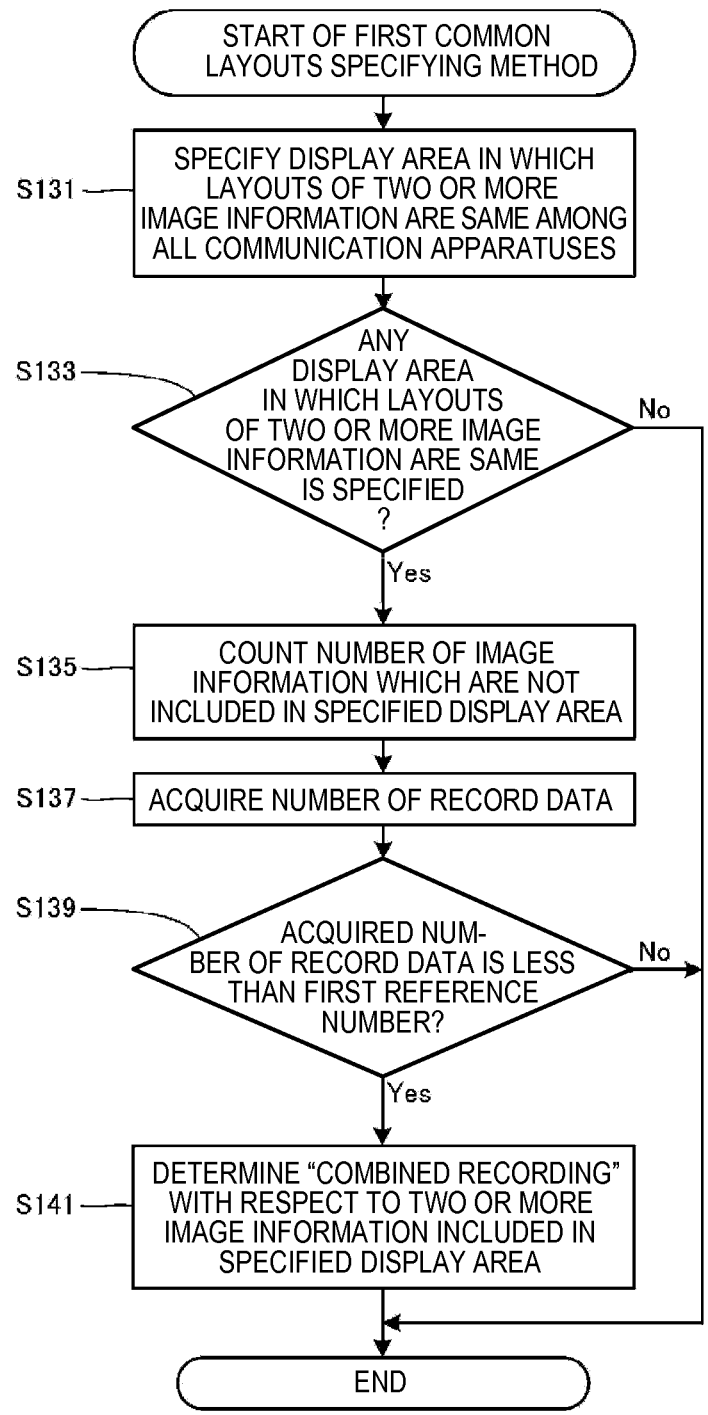
FIG. 12 is a flow chart of a first common layout specifying process.

(1) In the first common layout specifying process (see Step S101 of FIG. 11, and FIG. 12), a display area in which the layouts of two or more image information of the plurality of image information included in the remote conference screens 80 are the same (corresponding to each other) among all communication apparatuses 50A, 50B and 50C is specified (see Step S131 of FIG. 12). Thereafter, with respect to the two or more image information included in the display area specified in Step S131, the recording method "Combined Recording" is determined (see Step S141 of FIG. 12). In this case, the number of record data when "Combined Recording" is to be used is acquired (see Step S137 of FIG. 12). Then, it is determined whether the acquired number of record data is less than the number of record data (the first reference number) when "Combined Recording" is to be not used (Step S139 of FIG. 12). If the acquired number of record data is less than the number of record data when "Combined Recording" is to be not used (see "Yes" in Step S139 of FIG. 13), "Combined Recording" is determined.

Figure 13:
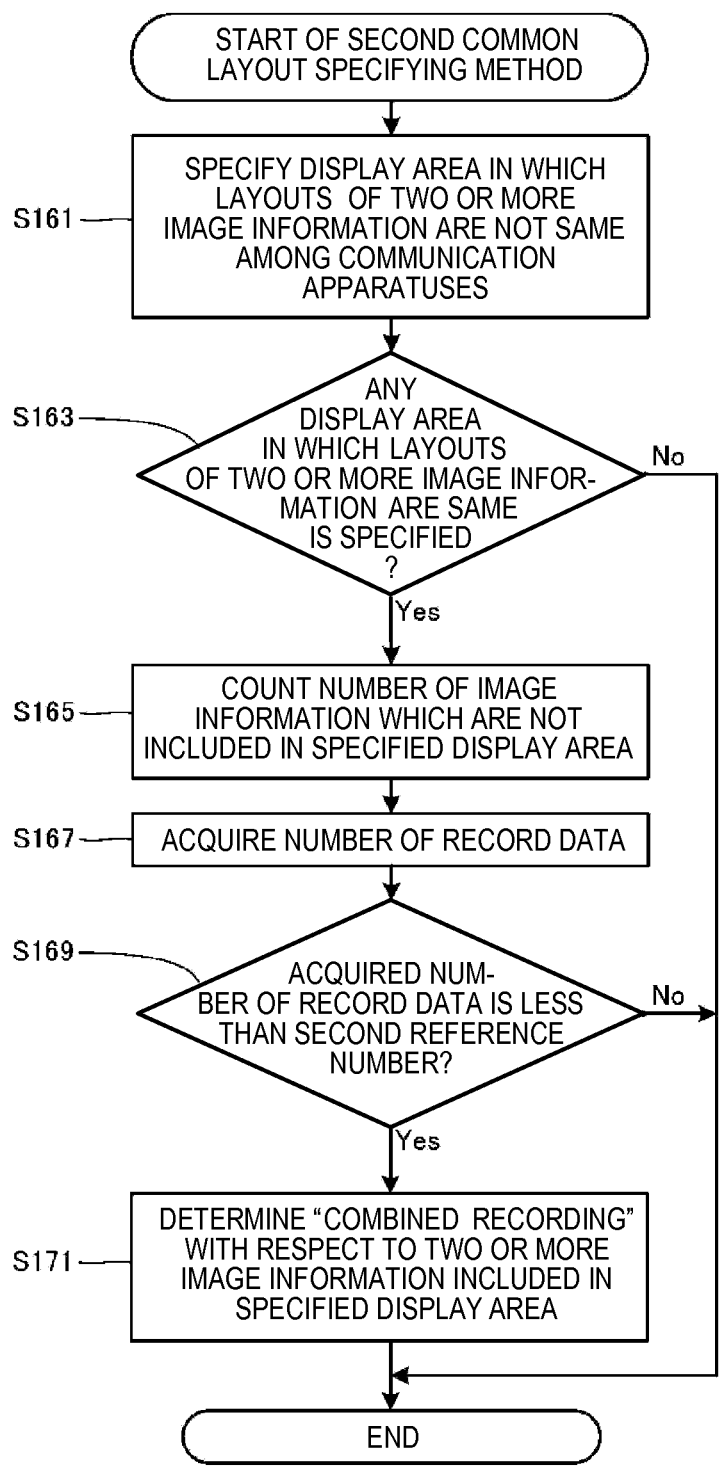
FIG. 13 is a flow chart of a second common layout specifying process.

Also, if any image information which is not a combined object exists in the first common layout specifying process (see "Yes" in Step S103 of FIG. 11), with respect to the image information which is not a combined object, the second common layout specifying process is performed (see Step S105 of FIG. 11, and FIG. 13). In the second common layout specifying process, the CPU 22 specifies a display area in which the layouts of two or more image information of the plurality of image data of the remote conference screens 80 being displayed on the displays 62 of two or more communication apparatuses 50 of all communication apparatuses 50A, 50B and 50C are the same (corresponding to each other) among the above described two ore more communication apparatuses 50 (see Step S161 of FIG. 13). Then, with respect to the two or more image information included in the display area specified in Step S161, the recording method "Combined Recording" is determined (see Step S171 of FIG. 13). In this case, the number of record data when "Combined Recording" is to be used is acquired (see Step S167 of FIG. 13). Then, it is determined whether the acquired number of record data is less than the number of record data (the second reference number) when "Combined Recording" is to be not used (Step S169 of FIG. 13). If the acquired number of record data is less than the number of record data when "Combined Recording" is to be not used (see "Yes" in Step S169 of FIG. 13), "Combined Recording" is determined.

Therefore, it is possible to reduce the total number of record data of the whole remote conference, and to suppress the data capacity of record data. The server apparatus 20 can provide remote conference screens 80 having image information arranged in the same states as those of the remote conference screens 80 which were displayed during the remote conference, to the users of the communication apparatuses 50A, 50B and 50C. After end of the remote conference, the users of the communication apparatuses 50A, 50B and 50C can visibly recognize the same remote conference screens 80 as those during the remote conference, and recall the remote conference.

(2) If any image information which is not a combined object exists in the second common layout specifying process (see "Yes" in Step S107 of FIG. 11), and the image information which is not a combined object is a unique image information (see "Yes" in Step S111 of FIG. 11), transmission of a generation start instruction is set with respect to a communication apparatus 50 displaying the unique image information (see Step S113 of FIG. 11). If transmission of the generation start instruction is set (see "Yes" in Step S75 of FIG. 9), the server apparatus 20 transmits the generation start instruction (see Step S77 of FIG. 9), and acquires a record data corresponding to the unique image information from the communication apparatus 50 which is the transmission destination (see Step S79 of FIG. 9). Therefore, even with respect to unique image information, a corresponding communication apparatus 50 can generate a record data corresponding to the unique image information, and the server apparatus 20 can acquire the record data from the corresponding communication apparatus 50. Accordingly, it is possible to reduce the processing load of the server apparatus 20.

Modified Illustrative Embodiment

The above described illustrative embodiment may be modified as follows.

(1) In the above, an example in which combinations of the layouts of image information are patterned, and the remote conference screens 80 using a plurality of patterned layout information is described. However, the layout of the image information in the remote conference screens 80 may be arbitrarily set by the users of the communication apparatuses 50A, 50B and 50C. In this case, the layout information can be represented by a coordinate system. Specifically, a layout information has a form in which the layouts of each image information (the image information areas 82, 84, 86 (the common area 87 and the personal area 88), and 90) are represented by coordinates (X and Y coordinates) based on a predetermined position in the displayable range of a display 62 (for example, the upper left corner of the displayable range), a width (W) and a height (H).

For example, in the communication apparatus process (see FIGS. 6 and 7), in each of the communication apparatuses 50A, 50B and 50C, as described above, layout information based on a coordinate system and designating the current layout of image information is stored and managed in the storage device 56 or the like. In Step S29 of FIG. 7, the layout information based on a coordinate system and designating the current layout of image information is compared with a layout information based on a coordinate system and transmitted to the server apparatus 20 in Step S31 of FIG. 7 performed in the previous time before Step S29 performed this time, and managed in the server apparatus 20, whereby whether the two layout information are same with each other is determined. If the result of Step S29 is negative (see "No" in Step S29), the layout information specified by the coordinate system is transmitted together with the apparatus ID from the communication device 70 to the server apparatus 20.

In the server apparatus 20, the layout information transmitted from the communication apparatus 50 and based on the coordinate system is registered in the layout table in association with the apparatus ID (see FIG. 14). Even with respect to the layout table having the form shown in FIG. 14, as described above, the conference ID representing the remote conference being performed is associated. In the layout table shown in FIG. 14, there is shown a case where the image information area 82 (all of the capture images 13A, 13B and 13C are not displayed), and the image information area 86 (the common area 87 and the personal area 88) for which a value "0, 0, 0, 0" is registered are not included in the remote conference screens 80.

In Step S131 of FIG. 12, for example, by comparing values for each of the image information areas 82, 84, 86 (the common area 87 and the personal area 88), and 90, as described above, a display area in which the layouts of two or more image information of the plurality of image information of the remote conference screens 80 being displayed on the displays 62 of all communication apparatuses 50A, 50B and 50C are the same among all communication apparatuses 50 is specified. Also, in Step S161 of FIG. 13, for example, by comparing values for each of the image information areas 82, 84, 86 (the common area 87 and the personal area 88), and 90, as described above, a display area in which the layouts of two or more image information of the plurality of image information of the remote conference screens 80 being displayed on the displays 62 of two or more communication apparatuses 50 of all communication apparatuses 50 are the same between the two or more communication apparatuses 50 is specified.

(2) In the above, description of determination on a recording method taking into account the number of communication apparatuses 50 which are used in a remote conference is omitted. In a case where the number of record data decreases if record data corresponding to the entire remote conference screen 80 being displayed is generated for each communication apparatus 50, this recording method may be determined.

What is claimed is:

1. A non-transitory computer-readable medium storing computer-readable instructions, the instructions, when executed by a processor of a server apparatus, causing the processor to perform operations comprising:
   a first acquiring operation acquiring a plurality of image data from each of a plurality of communication apparatuses through a network, the plurality of image data corresponding respectively to a plurality of image information included in remote conference screens, the remote conference screens being respectively displayed on displays of the communication apparatuses according to media data distributed to the communication apparatuses through the network;
   a second acquiring operation acquiring layout information from each of the communication apparatuses through the network, the layout information designating a layout of the plurality of image information at a corresponding one of the remote conference screens displayed on a corresponding one of the displays of a corresponding one of the communication apparatuses;
   a registering operation registering the layout information of each of the communication apparatuses acquired by the second acquiring operation, in a storage device in association with apparatus information identifying the corresponding one of the communication apparatuses from which the layout information is acquired;
   a third acquiring operation acquiring a recording start instruction representing instructing start of recording of a remote conference, from any one of the communication apparatuses through the network;
   a specifying operation specifying, in response to the third acquiring operation acquiring the recording start instruction, based on the layout information of the communication apparatuses registered in the storage device in association with the apparatus information:
      a first display area in which layouts of two or more image information of the plurality of image information of the remote conference screens correspond to each other between two or more of the communication apparatuses, and
      a second display area in which layouts of two or more image information of the plurality of image information of the remote conference screens do not correspond to each other between any of the communication apparatuses;
   a first generating operation combining, in response to the third acquiring operation acquiring the recording start instruction, two or more image data corresponding respectively to the two or more image information included in the first display area specified by the specifying operation, and generating one first kind record data corresponding to the two or more image information which are arranged in the layout of the two or more image information included in the first display area; and
   a fourth acquiring operation acquiring, in response to the third acquiring operation acquiring the recording start instruction, second kind record data individually corresponding to image information included in the second display area specified by the specifying operation.

2. The non-transitory computer-readable medium according to claim 1,
wherein the specifying operation comprises:
based on the layout information of the communication apparatuses, specifying a third display area in which layouts of two or more image information of the plurality of image information of the remote conference screens correspond to each other among all of the communication apparatuses.

3. The non-transitory computer-readable medium according to claim 1,
wherein the operations performed by the processor further comprise:
a comparing operation comparing a total number of a number of first kind record data when the first kind record data is to be generated by the first generating operation according to specifying of the specifying operation and a number of second kind record data when the second kind record data is to be acquired by the fourth acquiring operation, with a reference number corresponding to the plurality of image information included in the remote conference screens displayed on the displays of the communication apparatuses, and
wherein the first generating operation comprises:
generating the first kind record data when the total number of the first kind record data and the second kind record data is less than the reference number.

4. The non-transitory computer-readable medium according to claim 1,
wherein the operations performed by the processor further comprise:
a first communication control operation outputting, in response to the third acquiring operation acquiring a recording start instruction, to a communication device of the server apparatus, an instruction representing transmitting a generation start instruction representing instructing generation of second kind record data to a specific communication apparatus of the communication apparatuses through the network, and
wherein the fourth acquiring operation comprises:
acquiring the second kind record data from the specific communication apparatus through the network.

5. The non-transitory computer-readable medium according to claim 1,
wherein the registering operation comprises:
registering one layout identification information of a plurality of layout identification information in the storage device in association with each of the apparatus information, each of the plurality of layout identification information defining a combination pattern of a layout of the plurality of image information, and
wherein the specifying operation comprises:
specifying the first display area in which the layouts of the two or more image information correspond to each other when the layout identification information associated with the apparatus information of two or more communication apparatuses are same.

6. A server apparatus comprises:
a processor; and
memory storing computer-readable instructions, the instructions, when executed by the processor, causing the processor to perform operations comprising:
a first acquiring operation acquiring a plurality of image data from each of a plurality of communication apparatuses through a network, the plurality of image data corresponding respectively to a plurality of image information included in remote conference screens, the remote conference screens being respectively displayed on displays of the communication apparatuses according to media data distributed to the communication apparatuses through the network;
a second acquiring operation acquiring layout information from each of the communication apparatuses through the network, the layout information designating a layout of the plurality of image information at a corresponding one of the remote conference screens displayed on a corresponding one of the displays of a corresponding one of the communication apparatuses;
a registering operation registering the layout information of each of the communication apparatuses acquired by the second acquiring operation, in a storage device in association with apparatus information identifying the corresponding one of the communication apparatuses from which the layout information is acquired;
a third acquiring operation acquiring a recording start instruction representing instructing start of recording of a remote conference, from any one of the communication apparatuses through the network;
a specifying operation specifying, in response to the third acquiring operation acquiring the recording start instruction, based on the layout information of the communication apparatuses registered in the storage device in association with the apparatus information:
a first display area in which layouts of two or more image information of the plurality of image information of the remote conference screens correspond to each other between two or more of the communication apparatuses, and
a second display area in which layouts of two or more image information of the plurality of image information of the remote conference screen do not correspond to each other between any of the communication apparatuses;
a first generating operation combining, in response to the third acquiring operation acquiring the recording start instruction, two or more image data corresponding respectively to the two or more image information included in the first display area specified by the specifying operation, and generating one first kind record data corresponding to the two or more image information which are arranged in the layout of the two or more image information included in the first display area; and
a fourth acquiring operation acquiring, in response to the third acquiring operation acquiring the recording start instruction, second kind record data individually corresponding to image information included in the second display area specified by the specifying operation.

* * * * *